US 11,500,425 B2

(12) United States Patent
Togashi

(10) Patent No.: US 11,500,425 B2
(45) Date of Patent: Nov. 15, 2022

(54) DISPLAY DEVICE

(71) Applicant: SHARP KABUSHIKI KAISHA, Sakai (JP)

(72) Inventor: Yasuyuki Togashi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 50 days.

(21) Appl. No.: 17/279,541

(22) PCT Filed: Sep. 28, 2018

(86) PCT No.: PCT/JP2018/036353
§ 371 (c)(1),
(2) Date: Mar. 24, 2021

(87) PCT Pub. No.: WO2020/065936
PCT Pub. Date: Apr. 2, 2020

(65) Prior Publication Data
US 2021/0341972 A1   Nov. 4, 2021

(51) Int. Cl.
*G06F 1/16* (2006.01)
*E05D 3/06* (2006.01)

(52) U.S. Cl.
CPC .......... *G06F 1/1652* (2013.01); *G06F 1/1681* (2013.01); *E05D 3/06* (2013.01); *E05Y 2900/606* (2013.01); *G06F 1/1616* (2013.01)

(58) Field of Classification Search
CPC combination set(s) only.
See application file for complete search history.

(56) References Cited

U.S. PATENT DOCUMENTS

| | | | |
|---|---|---|---|
| 9,651,998 B2 * | 5/2017 | Matsueda | H01L 51/0097 |
| 9,841,050 B2 * | 12/2017 | Hsu | G04G 17/045 |
| 9,915,086 B2 * | 3/2018 | Kato | G06F 1/1681 |
| 9,980,373 B2 * | 5/2018 | Jeong | G05B 11/01 |
| 10,520,992 B1 * | 12/2019 | Chang | G06F 1/1616 |
| 11,194,366 B2 * | 12/2021 | Cheng | G06F 1/1652 |
| 2015/0378397 A1 | 12/2015 | Park et al. | |
| 2016/0007441 A1 | 1/2016 | Matsueda | |
| 2017/0222177 A1 | 8/2017 | Matsueda | |
| 2017/0328102 A1 * | 11/2017 | Kato | G06F 1/1681 |
| 2018/0159069 A1 | 6/2018 | Matsueda | |
| 2020/0363843 A1 * | 11/2020 | Cheng | H04M 1/02 |
| 2021/0067614 A1 * | 3/2021 | Cheng | G06F 1/1681 |

FOREIGN PATENT DOCUMENTS

JP            2016015618 A        1/2016

* cited by examiner

*Primary Examiner* — Lisa Lea-Edmonds
(74) *Attorney, Agent, or Firm* — ScienBiziP, P.C.

(57) ABSTRACT

A housing unit of a display device according to an aspect of the disclosure includes a hinge member, a first housing, a second housing, a first lifter, a second lifter, and shafts. A link groove is provided in the first housing, a link groove is provided in the second housing, and in a state in which the housing unit is open at 180 degrees, the hinge member, the first lifter, and the second lifter are aligned on the same plane.

20 Claims, 25 Drawing Sheets

DISPLAY DEVICE

TECHNICAL FIELD

The disclosure relates to a display device including a foldable housing unit and a flexible display panel.

BACKGROUND ART

In recent years, as foldable display devices, display devices have been proposed each of which ensures the curvature of a display panel when the display device is folded by configuring the display panel of a folded portion unfixed and providing a space section that allows the display panel of the folded portion to curve and enter when the display device is being folded.

As an example of such a display device, PTL 1 discloses a display device including a housing unit that includes first and second receiving portions rotatably connected to first and second support members with a hinge, first and second rotary levers that move the first and second receiving portions, and a movable support member that rotatably supports the first and second rotary levers. The display device supports the display panel with the movable support member, the first and second receiving portions, and the first and second support members when the housing unit is deployed, while forming, when the housing unit is being folded, a space section for receiving the display panel of a folded portion to bent with the movable support member, the first and second receiving portions, and the first and second rotary levers.

PTL 2 discloses a display device including a housing unit that includes a first housing composed of a plurality of plate-shaped housings connected by a plurality of hinge portions and forming a space for storing a folded portion of a display panel when the housing unit is folded, a plate-shaped second housing and third housing that are connected foldable in opposite directions to each other at both ends of the first housing, and a sliding retention member that fixes the second housing and the third housing when the housing unit is deployed and supports the folded portion of the display panel.

CITATION LIST

Patent Literature

PTL 1: US 2015/0378397 A
PTL 2: JP 2016-015618 A

SUMMARY

Technical Problem

However, in the display device disclosed in PTL 1, while the first and second receiving portions are moved by the first and second rotary levers so as to support the display panel by the movable support member, the first and second receiving portions, and the first and second support members when the display device is deployed, a gap (step) is created between the first and second receiving portions and the movable support member since the first and second receiving portions only rotate about the hinge. Since the foldable display panel is soft, pressing a portion of the gap causes a recess, and a touch panel cannot be used on the portion.

In the display device disclosed in PTL 2, the display panel is prevented from being recessed by using a sliding retention member. However, the mechanism becomes complex in attempting to slide the sliding retention member in conjunction with the opening/closing operation, and the first housing connected by the plurality of hinge portions has a protruding shape when the housing unit is deployed.

An object of the disclosure is to provide a display device that has little step on a support surface of a display panel in a housing unit and does not have a projection of a hinge portion when the housing unit is deployed.

Solution to Problem

In order to solve the problem described above, a display device according to an aspect of the disclosure is a display device including: a housing unit being foldable; and a display panel with flexibility, wherein the housing unit includes a hinge member having an elongated shape, a first housing and a second housing connected via the hinge member, a first support member in a flat plate shape provided in the first housing and supporting the display panel, a second support member in a flat plate shape provided in the second housing and supporting the display panel, a first fulcrum connecting the hinge member and an end portion of the first housing in a manner of being relatively rotatable between the hinge member and the first housing, a second fulcrum connecting the hinge member and an end portion of the second housing in a manner of being relatively rotatable between the hinge member and the second housing, a third fulcrum connecting the hinge member and a first end portion of the first support member in a manner of being relatively rotatable between the hinge member and the first support member, and a fourth fulcrum connecting the hinge member and a first end portion of the second support member in a manner of being relatively rotatable between the hinge member and the second support member, a first long hole is provided in the first housing, and the first long hole and a second end portion in the first support member on an opposite side to the first end portion are slidably connected, a second long hole is provided in the second housing, and the second long hole and a second end portion of the second support member on an opposite side to the first end portion are slidably connected, and in the display panel, one end portion of the display panel is fixed to the first housing, another end portion of the display panel is fixed to the second housing, and the hinge member, the first support member, and the second support member are arranged to be aligned on a same plane in a state in which the housing unit is opened to allow the display panel to be in an open state at 180 degrees.

Advantageous Effects of Disclosure

According to an aspect of the disclosure, it is possible to provide a display device that has little step on the support surface of the display panel in the housing unit and does not have a projection of the hinge portion when the housing unit is deployed.

DESCRIPTION OF EMBODIMENTS

Figure 1:
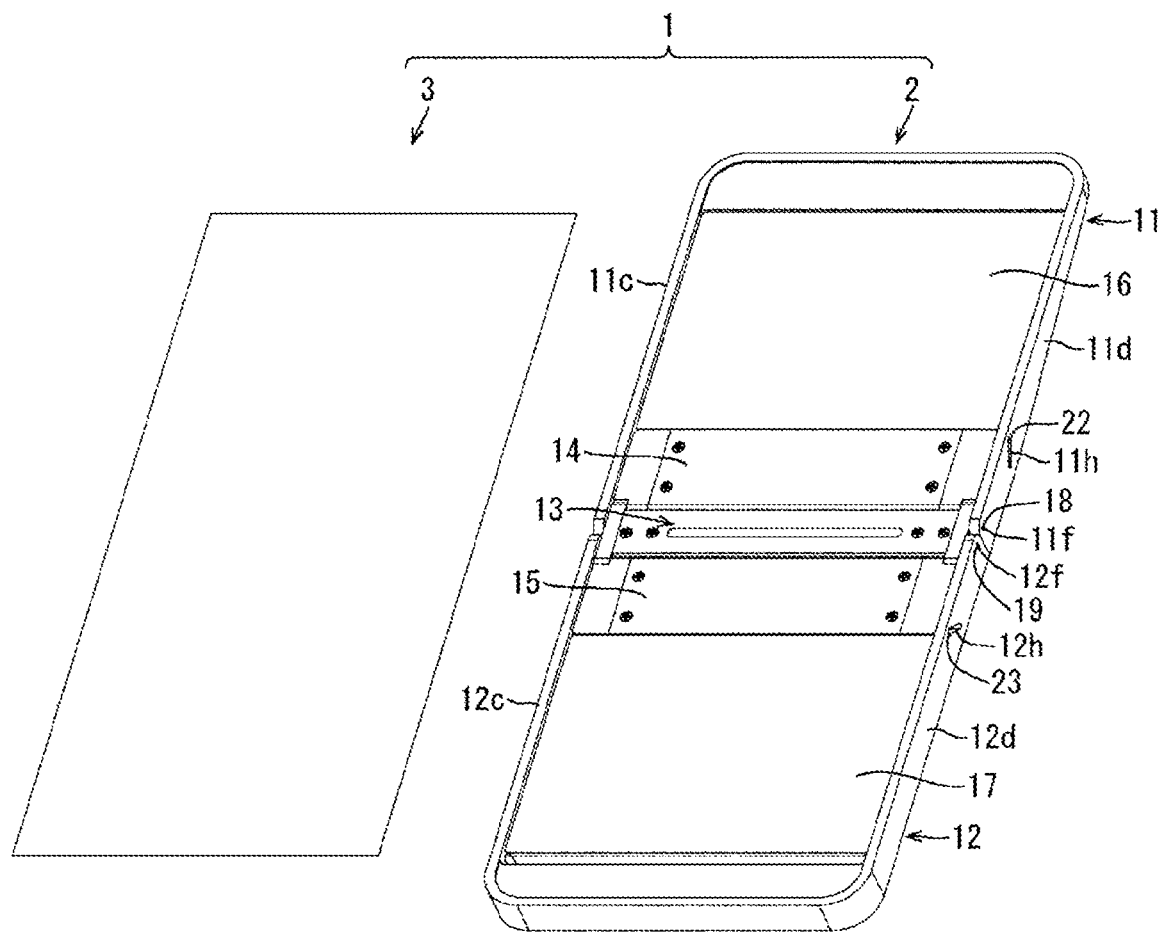
FIG. 1 is an exploded perspective view illustrating a schematic configuration of a display device according to a first embodiment.

Hereinafter, embodiments of the disclosure will be described in detail. Note that members having the same functions as those of members described earlier in each embodiment below will be denoted by the same reference numerals and signs, and the description thereof will not be repeated.

First Embodiment

Figure 2:
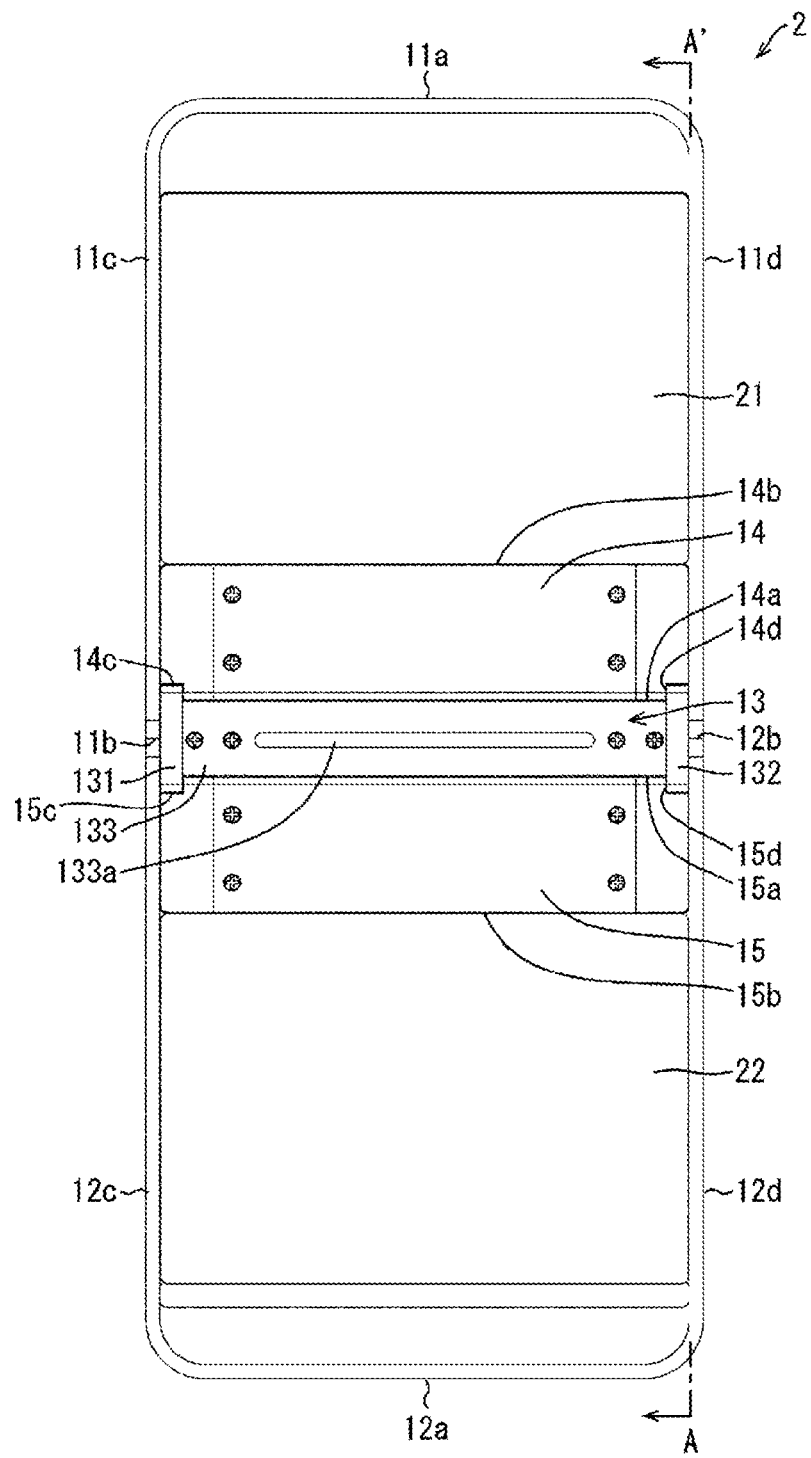
FIG. 2 is a plan view illustrating a schematic configuration of a housing unit according to the first embodiment.
Figure 3:
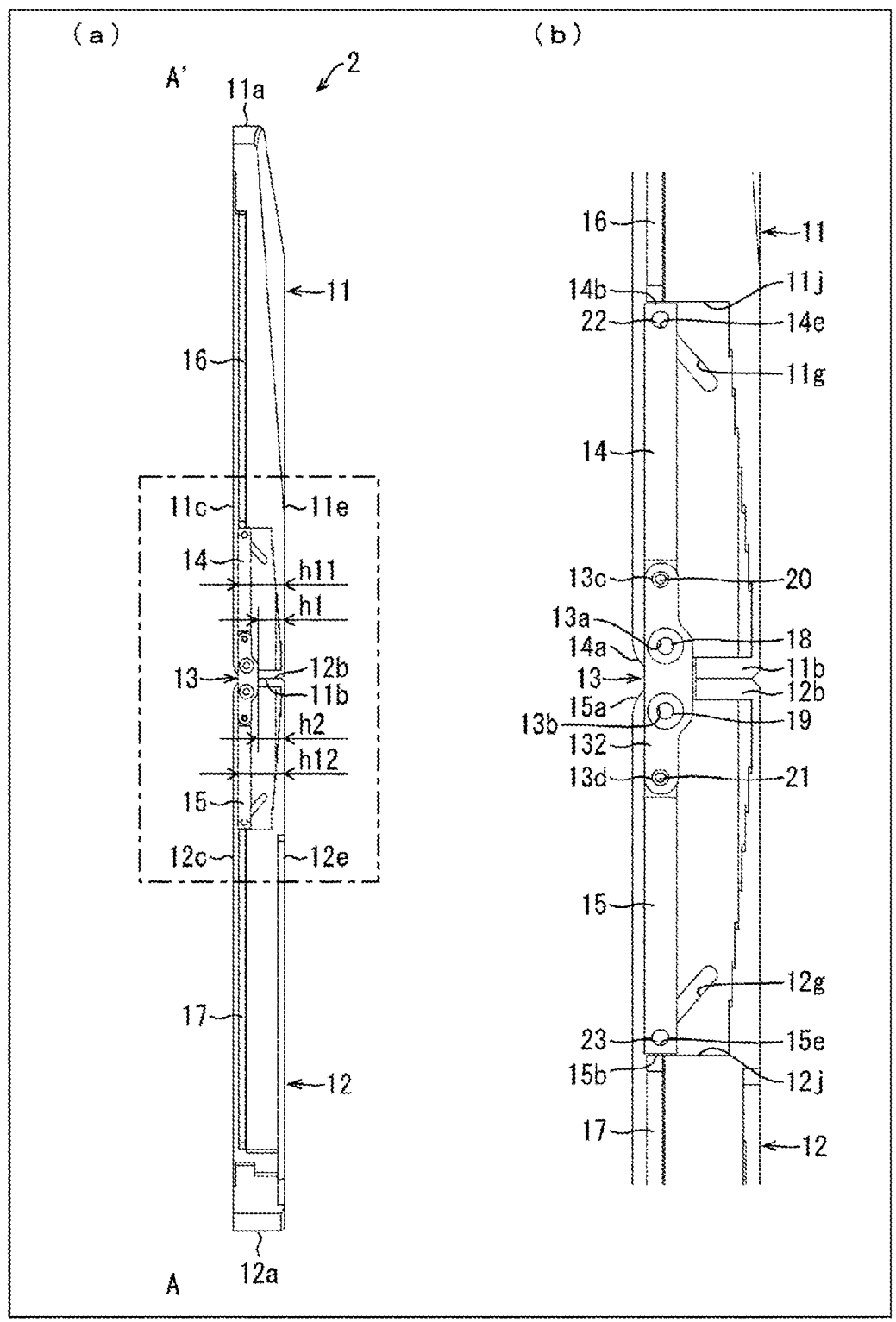
FIG. 3(*a*) is a cross-sectional view of the housing unit illustrated in FIG. 2 taken along line A-A', and (b) is an enlarged cross-sectional view of main portions illustrating a portion surrounded and indicated by dashed lines in (a).

FIG. 1 is an exploded perspective view illustrating a schematic configuration of a display device 1 according to the present embodiment. FIG. 2 is a plan view illustrating a schematic configuration of a housing unit 2 according to the present embodiment. (a) of FIG. 3 is a cross-sectional view of the housing unit 2 illustrated in FIG. 2 taken along line A-A', and (b) of FIG. 3 is an enlarged cross-sectional view of main portions illustrating a portion surrounded and indicated by dashed lines in (a) of FIG. 3.

As illustrated in FIG. 1, the display device 1 according to the present embodiment is a foldable (freely foldable) display device including a foldable housing unit 2 and a flexible display panel 3.

The display device 1 can select an arbitrary state between a folded state (namely, a closed state) in which the display device 1 is folded, and a deployed state (namely, an open state) in which the display device 1 is not folded, by an opening/closing operation.

Note that, unless stated otherwise below, a state in which the display device 1 (or the housing unit 2 described below) is open (deployed state) refers to a state in which the display device 1 (or the housing unit 2 described below) is deployed at 180 degrees, that is, a so-called fully flat state.

A description is given below in which, in the display device 1 and the housing unit 2, the attachment surface side of the display panel 3 is defined as an upper face side, and the opposite side to the attachment surface of the display panel 3 is defined as the lower face side (or the back face side or the rear face side).

As illustrated in FIG. 1 and FIG. 2, the housing unit 2 includes a first housing 11, a second housing 12, a hinge member 13, a first lifter 14, a second lifter 15, a first panel adhering plate 16, a second panel adhering plate 17, and shafts 18 to 22.

The first housing 11 and the second housing 12 are each a box-shaped container that is formed in a frame shape having a back plate and that has an opening in an upper face. The first housing 11 and the second housing 12 are each formed of a highly rigid material used as a housing for a display device in a related art.

The first housing 11 and the second housing are disposed facing each other such that, in a state in which the housing unit 2 is deployed, one end face (outer face in one sidewall) of the first housing 11 and one end face (outer face in one sidewall) of the second housing 12 are adjacent to each other.

In the present embodiment, the first housing 11 and the second housing 12 each have a rectangular shape, and as illustrated in FIG. 2 and (a) of FIG. 3, the first housing 11 and the second housing 12 are disposed facing each other such that, in a state in which the housing unit 2 is deployed, an outer face of one sidewall 11b of two sidewalls 11a and 11b parallel to the short-hand direction of the first housing 11 and an outer face of one sidewall 12b of two sidewalls 12a and 12b parallel to the short-hand direction of the second housing 12 are adjacent to each other.

The first housing 11 and the second housing 12 have the same size in a plan view, and, although not illustrated, are formed such that the first housing 11 and the second housing 12 completely overlap in a plan view when the display device 1 is folded.

The hinge member 13 according to the present embodiment is a polyaxial hinge. The hinge member 13 is formed in an elongated shape (a band shape elongated in one direction) and is attached to the first housing 11 and the second housing 12 so as to extend across the first housing 11 and the second housing 12 along the one end face of the first housing 11 and the one end face of the second housing 12 (in other words, in the direction of extension of the sidewalls 11b and 12b).

Here, as illustrated in (a) of FIG. 3, a height of a portion of the sidewall 11b in the first housing 11 adjacent to the second housing 12 in which the hinge member 13 is disposed is designated as h1, and a height of a portion of each of sidewalls 11c and 11d extending in a direction orthogonal to the direction of extension of the sidewall 11b (in other words, each of sidewalls 11c and 11d that is parallel to the longitudinal direction of the first housing 11; see FIG. 2) in which the hinge member 13 is disposed, and continuing to the sidewall 11b, is designated as h11. A height of a portion of the sidewall 12b in the second housing 12 adjacent to the first housing 11 (in other words, the sidewall 12b in the second housing 12 adjacent to the sidewall 11b; see FIG. 2) in which the hinge member 13 is disposed is designated as h2, and a height of a portion of each of sidewalls 12c and 12d extending in a direction orthogonal to the direction of extension of the sidewall 12b (in other words, each of sidewalls 12c and 12d that is parallel to the longitudinal direction of the second housing 12) in which the hinge member 13 is disposed, and continuing to the sidewall 12b, is designated as h12. Note that the heights of the sidewalls 11b, 11c, and 11d all indicate heights from a bottom portion 11e of the first housing 11. The heights of the sidewalls 12b, 12c, and 12d all indicate heights from a bottom portion 12e of the second housing 12. At this time, in the present embodiment, each of sidewalls 11b to 11d and 12b to 12d is formed such that $1=h2<h11=h12$ is satisfied.

The hinge member 13 is attached to the first housing 11 and the second housing 12 such that, as illustrated in FIG. 2, one end face of both end faces parallel to the short-hand direction of the hinge member 13, which are attachment surfaces to the first housing 11 and the second housing 12, abuts on the inner faces of the sidewalls 11c and 12c so as to extend across the sidewalls 11c and 12c adjacent to each other in the longitudinal direction of the first housing 11 and the second housing 12, while the other end face abuts on the inner faces of the sidewalls 11d and 12d facing the sidewalls 11c and 12c so as to extend across the sidewalls 11d and 12d adjacent to each other in the longitudinal direction of the first housing 11 and the second housing 12.

The hinge member 13 is attached to the first housing 11 and the second housing 12 such that, as illustrated in (a) and (b) of FIG. 3, the back face thereof abuts on the upper faces of the sidewalls 11b and 12b so as to extend across the sidewalls 11b and 12b adjacent to each other in the short-hand direction of the first housing 11 and the second housing 12 in a state in which the housing unit 2 is deployed.

Specifically, as illustrated in FIG. 2, the hinge member 13 includes a first attachment portion 131 and a second attachment portion 132 having the attachment surfaces, and a connecting portion 133 having an elongated shape (a band shape elongated in one direction) that connects the first attachment portion 131 and the second attachment portion 132. The first attachment portion 131 abuts on the inner faces of the sidewalls 11c and 12c so as to extend across the sidewalls 11c and 12c, and the second attachment portion 132 abuts on the inner faces of the sidewalls 11d and 12d so as to extend across the sidewalls 11d and 12d. The connecting portion 133 abuts on the upper faces of the sidewalls 11b and 12b so as to extend across the sidewalls 11b and 12b in a state in which the housing unit 2 is deployed. Note that the first attachment portion 131 and the second attachment portion 132 are formed wider than the connecting portion 133 in the short-hand direction of the hinge member 13.

As illustrated in (b) of FIG. 3, in the hinge member 13, a hole 13c for inserting the shaft 20, a hole 13a for inserting the shaft 18, a hole 13b for inserting the shaft 19, and a hole 13d for inserting the shaft 21 are provided in this order from the first housing 11 side toward the second housing 12 side in the short-hand direction of the hinge member The holes 13a to 13d are formed through the first attachment portion 131, the connecting portion 133, and the second attachment portion 132 in the longitudinal direction of the hinge member 13, for example.

The shaft 18 (first shaft) is a first hinge axis, and connects the hinge member 13 and one end portion of the first housing 11 on the hinge member 13 side so as to allow the hinge member 13 and the first housing 11 to relatively rotatably connect each other. Specifically, the shaft 18 connects the hinge member 13 and each end portion of the first housing 11 facing the hinge member 13 in the longitudinal direction of the hinge member 13 (specifically, each end portion of the sidewalls 11c and 11d of the first housing 11 on the second housing 12 side which are parallel in the longitudinal direction), thereby connecting the hinge member 13 and the end portions of the first housing 11 on the sidewall 11b side so as to allow the hinge member 13 and the first housing to relatively rotatably connect each other. Thus, the shaft 18 functions as a first fulcrum that relatively rotatably connects the hinge member 13 and the first housing 11.

The shaft 19 (second shaft) is a second hinge axis, and connects the hinge member 13 and one end portion of the second housing 12 on the hinge member 13 side so as to allow the hinge member 13 and the second housing 12 to relatively rotatably connect each other. Specifically, the shaft 19 connects the hinge member 13 and each end portion of the second housing 12 facing the hinge member 13 in the longitudinal direction of the hinge member 13 (specifically, each end portion of the sidewalls 12c and 12d of the second housing 12 on the first housing 11 side which are parallel in the longitudinal direction), thereby connecting the hinge member 13 and the end portions of the second housing 12 on the sidewall 12b side so as to allow the hinge member 13 and the second housing to relatively rotatably connect each other. Thus, the shaft 19 functions as a second fulcrum that relatively rotatably connects the hinge member 13 and the second housing 12.

The shaft 18 is provided through the sidewall 11c of the first housing 11, the hinge member 13, and the sidewall 11d of the first housing 11, in the longitudinal direction of the hinge member 13. Therefore, as illustrated in FIG. 1, a hole 11f (through-hole) for inserting the shaft 18 is formed in the sidewall 11d of the first housing 11 in correspondence with the hole 13a. Although not illustrated, a hole (through-hole) for inserting the shaft 18 is formed in the sidewall 11c of the first housing 11 in correspondence with the hole 13a.

Similarly, the shaft 19 is provided through the sidewall 12c of the second housing 12, the hinge member 13, and the sidewall 12d of the second housing 12, in the longitudinal direction of the hinge member 13. Therefore, as illustrated in FIG. 1, a hole 12f (through-hole) for inserting the shaft 19 is formed in the sidewall 12d of the second housing 12 in correspondence with the hole 13b. Although not illustrated, a hole (through-hole) for inserting the shaft 19 is formed in the sidewall 12c of the second housing 12 in correspondence with the hole 13b.

As described above, the hinge member 13 connects the first housing 11 and the second housing 12 with the hinge member 13 therebetween, and connects the first lifter 14 and the second lifter 15 by the hinge member 13.

As illustrated in FIG. 2, the first lifter 14 is formed in an elongated shape (a band shape elongated in one direction) that is wider than the hinge member 13, and functions as a first support member in a flat plate shape that supports the display panel 3. The first lifter 14 is connected to the hinge member 13 while being connected to the first housing 11 to be provided in the first housing 11.

Similar to the first lifter 14, the second lifter 15 is also formed in an elongated shape (a band shape elongated in one direction) that is wider than the hinge member 13. The second lifter 15 functions as a second support member in a flat plate shape that supports the display panel 3. The second lifter 15 is connected to the hinge member 13 while being connected to the second housing 12 to be provided in the second housing 12. The first lifter 14 and the second lifter 15 have the same size, and are formed so as to be linearly symmetrical in a plan view with respect to the hinge member 13.

As described above, the first attachment portion 131 and the second attachment portion 132 are formed wider than the connecting portion 133 in the short-hand direction of the hinge member 13. Thus, the first attachment portion 131 and the second attachment portion 132 protrude from the connecting portion 133 in the short-hand direction of the hinge member 13 at both end portions in the short-hand direction of the hinge member A notched portion 14c that mates with the first attachment portion 131 protruding in the short-hand direction of the hinge member 13 is provided in a face of the first lifter 14 facing the first attachment portion 131 of the hinge member 13. A notched portion 14d that mates with the second attachment portion 132 protruding in the short-hand direction of the hinge member 13 is provided in a face of the first lifter 14 facing the second attachment portion 132 of the hinge member 13.

Similarly, a notched portion 15c that mates with the first attachment portion 131 protruding in the short-hand direction of the hinge member 13 is provided in a face of the second lifter 15 facing the first attachment portion 131 of the hinge member 13. A notched portion 15d that mates with the second attachment portion 132 protruding in the short-hand direction of the hinge member 13 is provided in a face of the second lifter 15 facing the second attachment portion 132 of the hinge member 13.

The shaft 20 (third shaft) is a third hinge axis, and connects the hinge member 13 and one end portion of the first lifter 14 on the hinge member 13 side so as to allow the hinge member 13 and the first lifter 14 to relatively rotatably connect each other. Specifically, the shaft 20 connects the hinge member 13 and each end portion of the first lifter 14 facing the hinge member 13 in the longitudinal direction of the hinge member 13 (specifically, an end portion on the longitudinal direction side of the first lifter 14 facing the first attachment portion 131 of the hinge member 13 in the notched portion 14c of the first lifter 14, and an end portion on the longitudinal direction side of the first lifter 14 facing the second attachment portion 132 of the hinge member 13 in the notched portion 14d of the first lifter 14), thereby connecting the hinge member 13 and the end portion 14a (first end portion) of the first lifter 14 so as to allow the hinge member 13 and the first lifter 14 to relatively rotatably connect each other. Thus, the shaft 20 functions as a third fulcrum that relatively rotatably connects the hinge member 13 and the first lifter 14.

The shaft 21 (fourth shaft) is a fourth hinge axis, and connects the hinge member 13 and one end portion of the second lifter 15 on the hinge member 13 side so as to allow the hinge member 13 and the second lifter 15 to relatively rotatably connect each other. Specifically, the shaft 21 connects the hinge member 13 and each end portion of the second lifter 15 facing the hinge member 13 in the longitudinal direction of the hinge member 13 (specifically, an end portion on the longitudinal direction side of the second lifter 15 facing the first attachment portion 131 of the hinge member 13 in the notched portion 15c of the second lifter 15, and an end portion on the longitudinal direction side of the second lifter 15 facing the second attachment portion 132 of the hinge member 13 in the notched portion 15d of the second lifter 15), thereby connecting the hinge member 13 and the end portion 15a (first end portion) of the second lifter 15 so as to allow the hinge member 13 and the second lifter 15 to relatively rotatably connect each other. Thus, the shaft 21 functions as a fourth fulcrum that relatively rotatably connects the hinge member 13 and the second lifter 15.

The shaft 20 is provided through the first attachment portion 131 of the hinge member 13, the first lifter 14, and the second attachment portion 132 of the hinge member 13 in the longitudinal direction of the hinge member 13. Therefore, a hole (through-hole) (not illustrated) for inserting the shaft 20 is formed in the end portion 14a of the first lifter 14 in the longitudinal direction of the first lifter 14 in correspondence with the hole 13c provided in the hinge member 13.

The shaft 21 is provided through the first attachment portion 131 of the hinge member 13, the second lifter 15, and the second attachment portion 132 of the hinge member 13 in the longitudinal direction of the hinge member 13. Therefore, a hole (through-hole) (not illustrated) for inserting the shaft 21 is formed in the end portion 15a of the second lifter 15 in the longitudinal direction of the second lifter 15 in correspondence with the hole 13d provided in the hinge member 13.

Note that in the present embodiment, a description is given in which the shaft 20 is provided through the first lifter 14 and the second attachment portion 132 of the hinge member 13, but the present embodiment is not limited thereto.

For example, as the shaft 20 (third fulcrum), a projection protruding parallel to the longitudinal direction of the hinge member 13 may be provided in the notched portion 14c of the first lifter 14, and a projection protruding parallel to the longitudinal direction of the hinge member 13 may be provided on the extension line of the projection described above in the notched portion 14d of the first lifter 14.

Similarly, the shaft 21 (fourth fulcrum) may be a projection provided on the notched portion 15c of the second lifter 15 and protruding parallel to the longitudinal direction of the hinge member 13, and a projection provided so as to be disposed on the extension line of the projection described above and protruding parallel to the longitudinal direction of the hinge member 13 provided on the notched portion 15d of the second lifter 15.

Note that in the present embodiment, the positional relationship of the shafts 18 to 21 does not change due to the opening/closing operation of the housing unit 2. Thus, as long as the hinge member 13 and the first housing 11 can be relatively rotatably connected, the shaft 18 (first fulcrum) may be a projection provided on the attachment surface of the first attachment portion 131 and protruding parallel to the longitudinal direction of the hinge member 13 and a projection provided on the attachment surface of the second attachment portion 132 and protruding parallel to the longitudinal direction of the hinge member 13. Similarly, as long as the hinge member 13 and the second housing 12 can be relatively rotatably connected, the shaft 19 (second fulcrum) may be a projection provided on the attachment surface of the first attachment portion 131 in alignment with the first fulcrum and protruding parallel to the longitudinal direction of the hinge member 13 and a projection provided on the attachment surface of the second attachment portion 132 in alignment with the first fulcrum and protruding parallel to the longitudinal direction of the hinge member 13.

The first housing 11 is provided with an elongate link groove 11g that passes through the sidewall 11c of the first housing 11 as illustrated in (b) of FIG. 3, and an elongate link groove 11h that passes through the sidewall 11d of the first housing 11 illustrated in FIG. 1, as first long holes. The link groove 11g and the link groove 11h are formed so as to be symmetrical with respect to a plane.

Meanwhile, the second housing 12 is provided with an elongate link groove 12g that passes through the sidewall 12c of the second housing 12 as illustrated in (b) of FIG. 3, and an elongate link groove 12h that passes through the sidewall 12d of the second housing 12 illustrated in FIG. 1, as second long holes. The link groove 12g and the link groove 12h are formed so as to be symmetrical with respect to a plane.

The link grooves 11g and 11h are provided in an oblique direction so as to move from the bottom portion 11e (see (a) of FIG. 3) side of the first housing 11 toward the display panel 3 side in a direction away from the hinge member 13 side such that the first lifter 14 moves in accordance with the open/closed state of the housing unit 2. The link grooves 12g and 12h are provided in an oblique direction so as to move from the bottom portion 12e (see (a) of FIG. 3) side of the second housing 12 toward the display panel 3 side in a direction away from the hinge member 13 side such that the second lifter 15 moves in accordance with the open/closed state of the housing unit 2.

In other words, the lower ends of the link grooves 11g and 11h are disposed nearer to the second housing 12 side (that is, nearer to the hinge member 13 side) than the upper ends are, and the lower ends of the link grooves 12g and 12h are disposed nearer to the second housing 12 side (that is, nearer to the hinge member 13 side) than the upper ends are. Thus, the link grooves 11g and 1h and the link grooves 12g and 12h are formed so as to have a V-shape that is not connected at the center portion in a cross-sectional view.

Note that, as illustrated in (a) to (c) of FIG. 5 described below, the link grooves 11g and 11h have groove portions parallel to the first panel adhering plate 16 at the upper end portions thereof for stably retaining the first lifter 14 at the upper ends thereof. Similarly, the link grooves 12g and 12h have groove portions parallel to the second panel adhering plate 17 at the upper end portions thereof for stably retaining the second lifter 15 at the upper ends thereof.

As illustrated in (b) of FIG. 3, the shaft 22 (fifth shaft) connects the link grooves 11g and 11h and an end portion 14b (second end portion) in the first lifter 14 on the opposite side to the end portion 14a (first end portion) on the hinge member 13 side such that the end portion 14b is slidably connected (that is, to slide within the link grooves 11g and 11h). The shaft 22 is used as a connecting portion between the link grooves 11g and 11h, which are the first long holes, and the end portion 14b of the first lifter 14.

The shaft 23 (sixth shaft) connects the link grooves 12g and 12h and an end portion 15b (second end portion) in the second lifter 15 on the opposite side to the end portion 15a (first end portion) on the hinge member 13 side such that the end portion 15b is slidably connected (that is, to slide within the link grooves 12g and 12h). The shaft 23 is used as a connecting portion between the link grooves 12g and 12h, which are the second long holes, and the end portion 15b of the second lifter 15.

The shaft 22 is provided through the link groove 11g of the first housing 11, the first lifter 14, and the link groove 11h of the first housing 11 in the longitudinal direction of the first lifter 14. A hole 14e for inserting the shaft 22 is provided in the first lifter 14.

The shaft 23 is provided through the link groove 12g of the second housing 12, the second lifter 15, and the link groove 12h of the second housing 12 in the longitudinal direction of the second lifter 15. A hole 15e for inserting the shaft 23 is provided in the second lifter 15.

However, similarly to the shafts 20 and 21, the shafts 22 and 23 may each be a projection protruding parallel to the longitudinal direction of each lifter corresponding to each link groove.

As illustrated in (b) of FIG. 3, the portion of the first housing 11 that overlaps with the first lifter 14 in a plan view is provided with a recessed groove portion 11j in a cross-sectional view that is used as a movable region (movable space) of the first lifter 14. Similarly, the portion of the second housing 12 that overlaps with the second lifter 15 in a plan view is provided with a recessed groove portion 12j in a cross-sectional view that is used as a movable region (movable space) of the second lifter 15. As a result, the first lifter 14 and the second lifter 15 slide in the corresponding groove portions 11j and 12j along the corresponding link grooves 11g, 11h, 12g, and 12h.

As illustrated in FIG. 1 to (a) and (b) of FIG. 3, the first housing 11 is provided with a first adhering plate 16 in a flat plate shape to which the display panel 3 is fixed. The second housing 12 is provided with a second adhering plate 17 in a flat plate shape to which the display panel 3 is fixed. In the present embodiment, the first adhering plate 16 and the second adhering plate 17 are fixed to the first housing 11 and the second housing 12 by, for example, an adhesive.

In the display panel 3, one end portion (specifically, in the longitudinal direction of the display panel 3) is fixed to the first adhering plate 16 by an adhesive, and the other end portion opposite to the one end portion is fixed to the second adhering plate 17 by an adhesive. As a result, the display panel 3 is fixed to the first housing 11 and the second housing 12 at the one end portion and the other end portion so as to extend across the first housing 11 and the second housing 12.

As illustrated in FIG. 2, an adhering portion 133a to which an adhesive is applied is provided in the longitudinal direction of the connecting portion 133 at the center portion of the face of the connecting portion 133 of the hinge member 13 facing the display panel 3. The display panel 3 is fixed only to the first adhering plate 16, the second adhering plate 17, and the adhering portion 133a via adhesive layers using the adhesive, and the display panel 3 is in an unfixed free state in portions other than the first adhering plate 16, the second adhering plate 17, and the adhering portion 133a.

Figure 4:
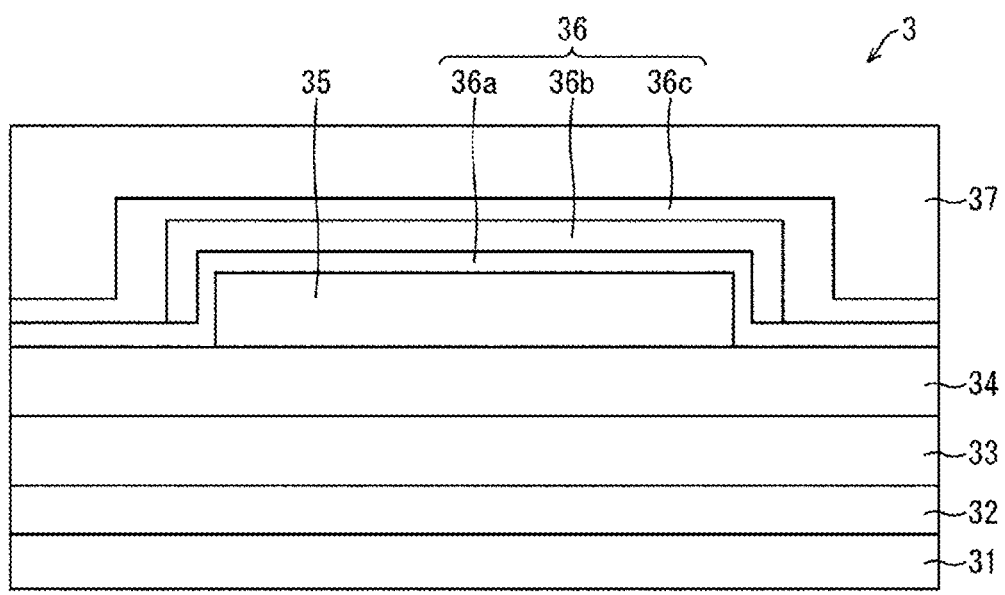
FIG. 4 is a cross-sectional view illustrating an example of a schematic configuration of a display panel according to the first embodiment.

FIG. 4 is a cross-sectional view illustrating an example of a schematic configuration of the display panel 3 according to the present embodiment.

As illustrated in FIG. 4, the display panel 3 has a configuration in which a lower face film 31, a resin layer 32, a barrier layer 33, a drive circuit layer 34, a light-emitting element layer 35, a sealing layer 36, and a touch panel 37 are layered in this order from the lower layer side (the adhesive layer side).

The lower face film 31 is, for example, a PET film for realizing the display device 1 having excellent flexibility by being bonded to the lower face of the resin layer 32 after the support substrate is peeled off. Examples of the material of the resin layer 32 include a polyimide and the like.

The barrier layer 33 is a layer that inhibits foreign matters such as water and oxygen from entering the drive circuit layer 34 and the light-emitting element layer 35, and can be constituted by a silicon oxide film, a silicon nitride film, or a silicon oxynitride film, or by a layered film of these, formed by a CVD method, for example.

The drive circuit layer 34 is, for example, a TFT layer including, for example, a semiconductor film, an inorganic insulating film (gate insulating film) in an upper layer overlying the semiconductor film, a gate electrode and a gate wiring line in an upper layer overlying the inorganic insulating film, an inorganic insulating film in an upper layer overlying the gate electrode and the gate wiring line, a capacitive electrode in an upper layer overlying the inorganic insulating film, an inorganic insulating film in an upper layer overlying the capacitive electrode, a source wiring line in an upper layer overlying the inorganic insulating film, and a flattening film (interlayer insulating film) in an upper layer overlying the source wiring line.

The light-emitting element layer 35 includes an anode in an upper layer overlying the flattening film, an edge cover having insulating properties and covering edges of the anode, an EL (electroluminescent) layer, for example, in an upper layer overlying the edge cover, and a cathode in an upper layer overlying the EL layer. On a subpixel-by-subpixel basis, a light-emitting element (for example, an organic light emitting diode (OLED) or a quantum dot light emitting diode (QLED)) including the island-shaped anode, the EL layer, and the cathode is formed in the light-emitting element layer, and a subpixel circuit that controls the light-emitting element is formed in the drive circuit layer 34.

For example, the EL layer is formed by layering a hole injection layer, a hole transport layer, a light-emitting layer, an electron transport layer, and an electron injection layer in this order, from the lower layer side, as a function layer. Note that a light-emitting element (such as an inorganic light emitting diode) other than the OLED or QLED may be formed in the light-emitting element layer.

The sealing layer 36 is transparent, and includes an inorganic sealing film 36a for covering the cathode, an organic buffer film 36b formed in an upper layer overlying the inorganic sealing film 36a, and an inorganic sealing film 36c formed in an upper layer overlying the organic buffer film 36b. The sealing layer 36 covering the light-emitting element layer 35 inhibits foreign matters such as water and oxygen from penetrating the light-emitting element layer 35.

Each of the inorganic sealing film 36a and the inorganic sealing film 36c is an inorganic insulating film and can be formed of, for example, a silicon oxide film, a silicon nitride film, or a silicon oxynitride film, or a layered film of these, formed by a CVD method. The organic buffer film 36b is a transparent organic film having a flattening effect and can be formed of a coatable organic material such as an acrylic. The organic buffer film 36b can be formed, for example, by ink-jet application, and a bank for stopping droplets may be provided in the non-display region.

A film-type touch panel made of a functional film having a touch sensor function is used for the touch panel 37.

Note that the display panel 3 described above is an example of the display panel 3 according to the present embodiment, and the types of the display panel 3 are not particularly limited as long as it is a flexible and foldable display panel.

As illustrated in (a) and (b) of FIG. 3, the hinge member 13, the first lifter 14, the second lifter 15, the first adhering plate 16, and the second adhering plate 17 are aligned so as to be on the same plane in a state in which the housing unit 2 is deployed at 180 degrees such that the display panel 3 is deployed at 180 degrees. Here, a state in which the hinge member 13, the first lifter 14, the second lifter 15, the first adhering plate 16, and the second adhering plate 17 are aligned on the same plane means that, in a state in which the adhesive layer is included, the hinge member 13, the first lifter 14, the second lifter 15, the first adhering plate 16, and the second adhering plate 17 are aligned on the same plane.

Thus, in a state in which the housing unit 2 is deployed at 180 degrees, the hinge member 13, the first lifter 14, the second lifter 15, the first adhering plate 16, and the second adhering plate 17 are planar on the upper faces thereof in a state in which the adhesive layers are included. Thus, the touch panel 37 can be used on the entire surface of the display panel 3.

Note that, in the display device 1 described above, the hinge member 13 and the first lifter 14 rotate relative to each other with the shaft 20 therebetween, and the hinge member 13 and the second lifter 15 rotate relative to each other with the shaft 21 therebetween, and thus, there are so-called rotary relief gaps for avoiding contact with each other in the connecting portion between the hinge member 13 and the first lifter 14 and the connecting portion between the hinge member 13 and the second lifter 15. However, the step by the gap is not greater than 1 mm, and touch operation can be sufficiently performed even on the gap.

According to the display device 1 described above, the first lifter 14 and the second lifter 15 can be operated in conjunction with the opening/closing operation of the housing unit 2 (in other words, the opening/closing operation of the display device 1), and a ledge of the hinge member 13 is not created.

The opening/closing operation of the housing unit 2 according to the present embodiment will be described below with reference to (a) to (e) of FIG. 5. (a) to (e) of FIG. 5 are cross-sectional views of main portions illustrating the opening/closing operation of the housing unit 2 according to the present embodiment.

Figure 5:
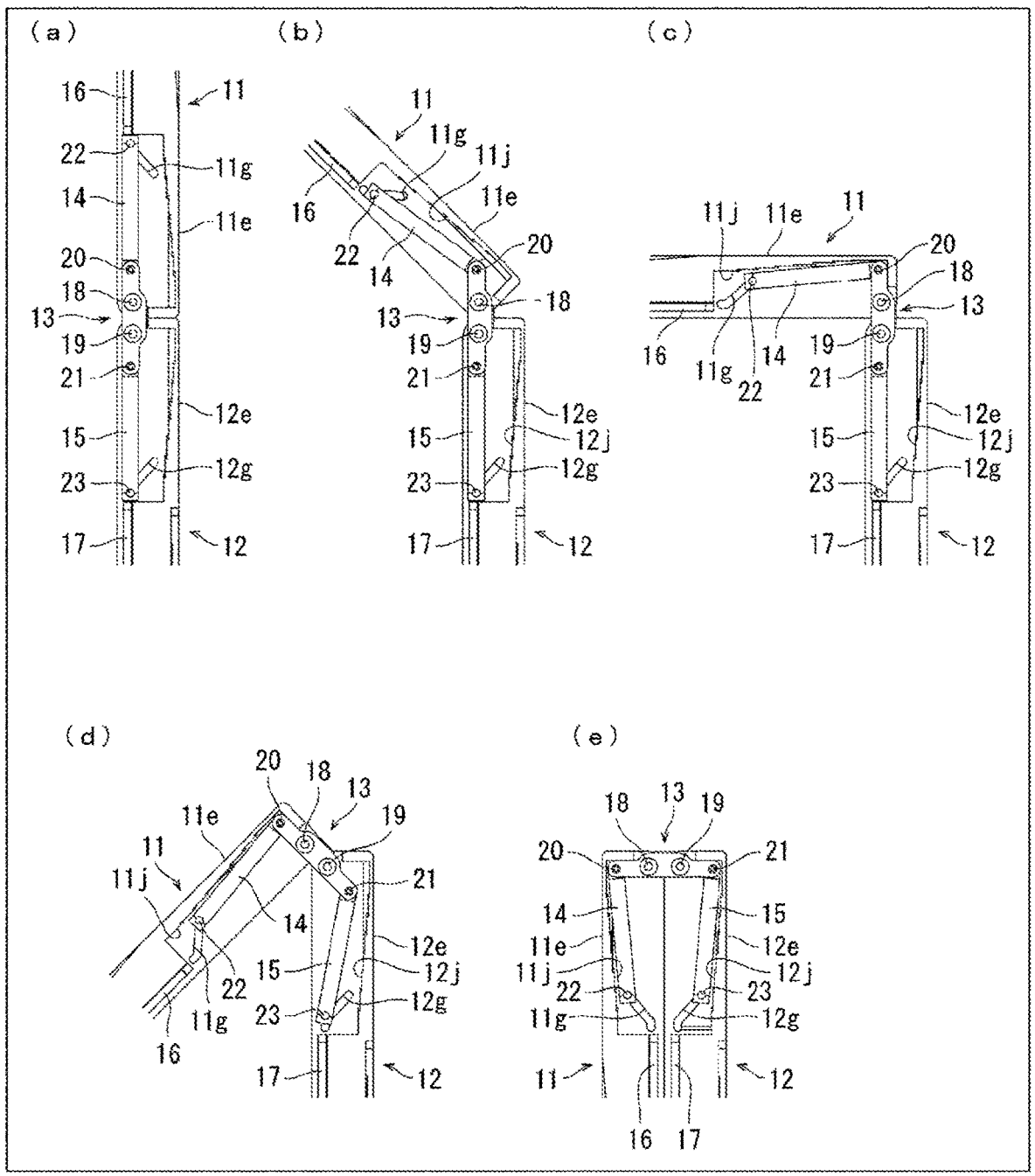
FIGS. 5(a) to (e) are cross-sectional views of main portions illustrating an opening/closing operation of the housing unit according to the first embodiment.

Note that (a) to (e) of FIG. 5 illustrate the opening/closing operation of the housing unit 2 when the first housing 11 is folded while the second housing 12 remains fixed as an example. (a) to (e) of FIG. 5 illustrate the portion surround and indicated by the dashed line in (a) of FIG. 3, as in (b) of FIG. 3.

The opening/closing operation of the housing unit 2 in a cross section on the formation side of the link grooves 11g and 12g will be described below as an example with reference to (a) to (e) of FIG. 5. However, the opening/closing operation of the housing unit 2 in the cross section on the formation side of the link grooves 11h and 12h is the same as the opening/closing operation described below. Thus, the link groove 11g and the link groove 12g can be read respectively the link groove 11h and the link groove 12h.

As illustrated in (a) of FIG. 5, in a state in which the housing unit 2 is deployed at 180 degrees, the shaft 22 (in other words, the connecting portion between the link groove 11g and the first lifter 14) is disposed on the upper end of the link groove 11g. In other words, at this time, the shaft 22 is disposed at a position closest to the display panel 3 (in the diagram illustrated in (a) of FIG. 5, the position closest to the first adhering plate 16 to which the display panel 3 is attached).

The shaft 23 (in other words, the connecting portion between the link groove 12g and the second lifter 15) is disposed on the upper end of the link groove 12g. In other words, at this time, the shaft 22 is disposed at a position closest to the display panel 3 (in the diagram illustrated in (a) of FIG. 5, the position closest to the second adhering plate 17 to which the display panel 3 is attached).

At this time, all the shafts 22 and 23 and the shafts 18 to 21 are disposed on the display panel 3 side, and the hinge member 13, the first lifter 14, the second lifter 15, the first adhering plate 16, and the second adhering plate 17 are aligned on the same plane.

The shaft 20 (third fulcrum), the shaft 18 (first fulcrum), the shaft 19 (second fulcrum), and the shaft 21 (fourth fulcrum) are aligned in this order from the first housing 11 side to the second housing 12 side in the hinge member 13. Note that, as illustrated in (a) to (e) of FIG. 5, the positional relationship of the shafts 18 to 21 does not change due to the opening/closing operation of the housing unit 2.

From this state, as illustrated in (b) of FIG. 5, when the first housing 11 is folded, the positions of the shaft 23 and the second lifter 15 do not change, but the shaft 22 slides along the link groove 11g from the upper end side to the lower end side of the link groove 11g. Accordingly, the first lifter 14 moves (drops) within the groove portion 11j from the display panel 3 side toward the bottom portion 11e side of the first housing 11.

Then, as illustrated in (c) of FIG. 5, at a stage when the first housing 11 is folded at 90 degrees with respect to the second housing 12, the shaft 22 reaches the lower end side of the link groove 11g, and the shaft 20 and the first lifter 14 are disposed within the groove portion 11j on the bottom portion 11e side of the first housing 11.

Thus, in a state in which the first housing 11 is folded at 90 degrees with respect to the second housing 12, the shafts 19, 21, and 23 are disposed on the display panel 3 side of the second housing 12, and the shaft 18 is disposed on the display panel 3 side of the first housing 11, while the shafts 20 and 22 are disposed on the bottom portion 11e side of the first housing 11.

Next, when the first housing 11 is further folded from this state as illustrated in (d) of FIG. 5, the shaft 23 slides along the link groove 12g from the upper end side to the lower end side of the link groove 12g. Accordingly, the second lifter 15 moves (drops) in the groove portion 12j from the display panel 3 side toward the bottom portion 12e side of the second housing 12.

Then, as illustrated in (e) of FIG. 5, at the stage when the housing unit 2 is folded and closed such that the first housing 11 and the second housing 12 face each other (in other words, the display panel 3 is in a folded state), the shaft 23 reaches the lower end side of the link groove 12g, and the shaft 21 and the second lifter 15 are disposed within the groove portion 12j on the bottom portion 12e side of the second housing 12.

As such, in a state in which the housing unit 2 folded and closed as illustrated in (e) of FIG. 5, the shaft 20 (third fulcrum) and the shaft 22 are disposed on the bottom portion 11e side of the first housing 11, and the shaft 21 (fourth fulcrum) and the shaft 23 are disposed on the bottom portion 12e side of the second housing 12. As a result, a space enclosed by the hinge member 13, the first lifter 14, and the second lifter 15 is formed between the first housing 11 and the second housing 12 (specifically, in the space enclosed by the groove portion 11j and the groove portion 12j).

Figure 6:
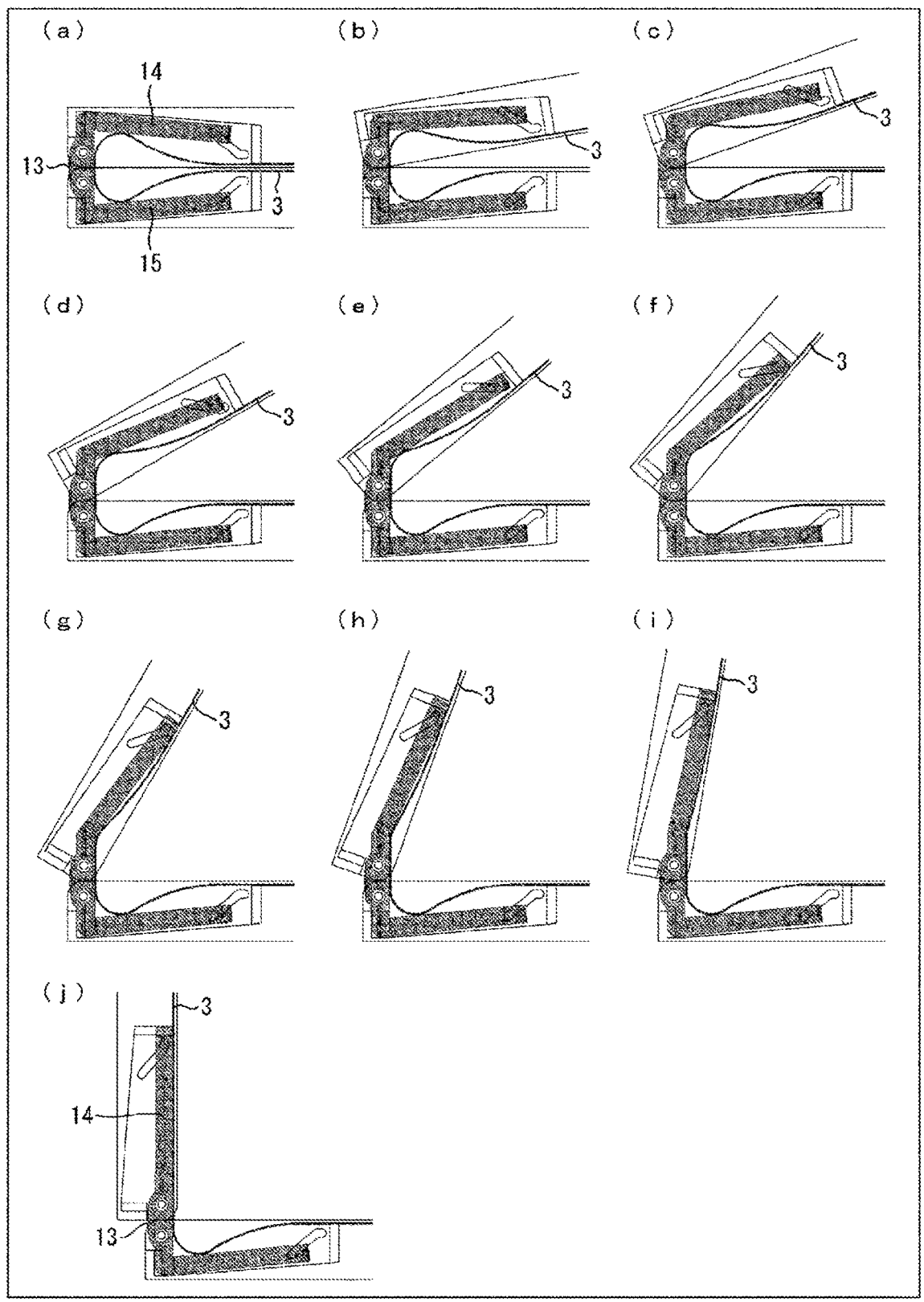
FIGS. 6(a) to (j) are diagrams schematically illustrating the shapes of the display panel associated with the opening/closing operation of the housing unit according to the first embodiment, and changes in a relationship between a hinge member, a first lifter, and a second lifter.

(a) to (j) of FIG. 6 are diagrams schematically illustrating the shapes of the display panel 3 associated with the opening/closing operation of the housing unit 2 according to the present embodiment, and changes in the relationship between the hinge member 13, the first lifter 14, and the second lifter 15.

As illustrated in (a) of FIG. 6, according to the present embodiment, in a state in which the housing unit 2 is closed as illustrated in (e) of FIG. 5, the bulge of the folded portion of the display panel 3 can be accommodated in the space enclosed by the hinge member 13, the first lifter 14, and the second lifter 15.

Note that the entire length of the display panel 3 is not changed by the deflection of the display panel 3 illustrated in (a) to (j) of FIG. 6 from the open state to the closed state of the housing unit 2. In other words, no load of pulling is applied to the display panel 3.

Note that the example illustrated in (a) to (j) of FIG. 6 illustrates the case in which only the first housing 11 is moved as illustrated in (a) to (e) of FIG. 5 to move only the shaft 20 of the shafts 20 and 21 illustrated in (a) to (e) of FIG. 5, and only the first lifter 14 of the first lifter 14 and the second lifter 15 is movable. However, the shaft 21 is also movable in the case where the second housing 12 is not fixed, and the second lifter 15 is movable so as to have a symmetrical shape with the first lifter 14 (in other words, the housing unit 2 is deployed at 180 degrees).

Second Embodiment

A description follows regarding differences from the first embodiment in the present embodiment.

Figure 7:
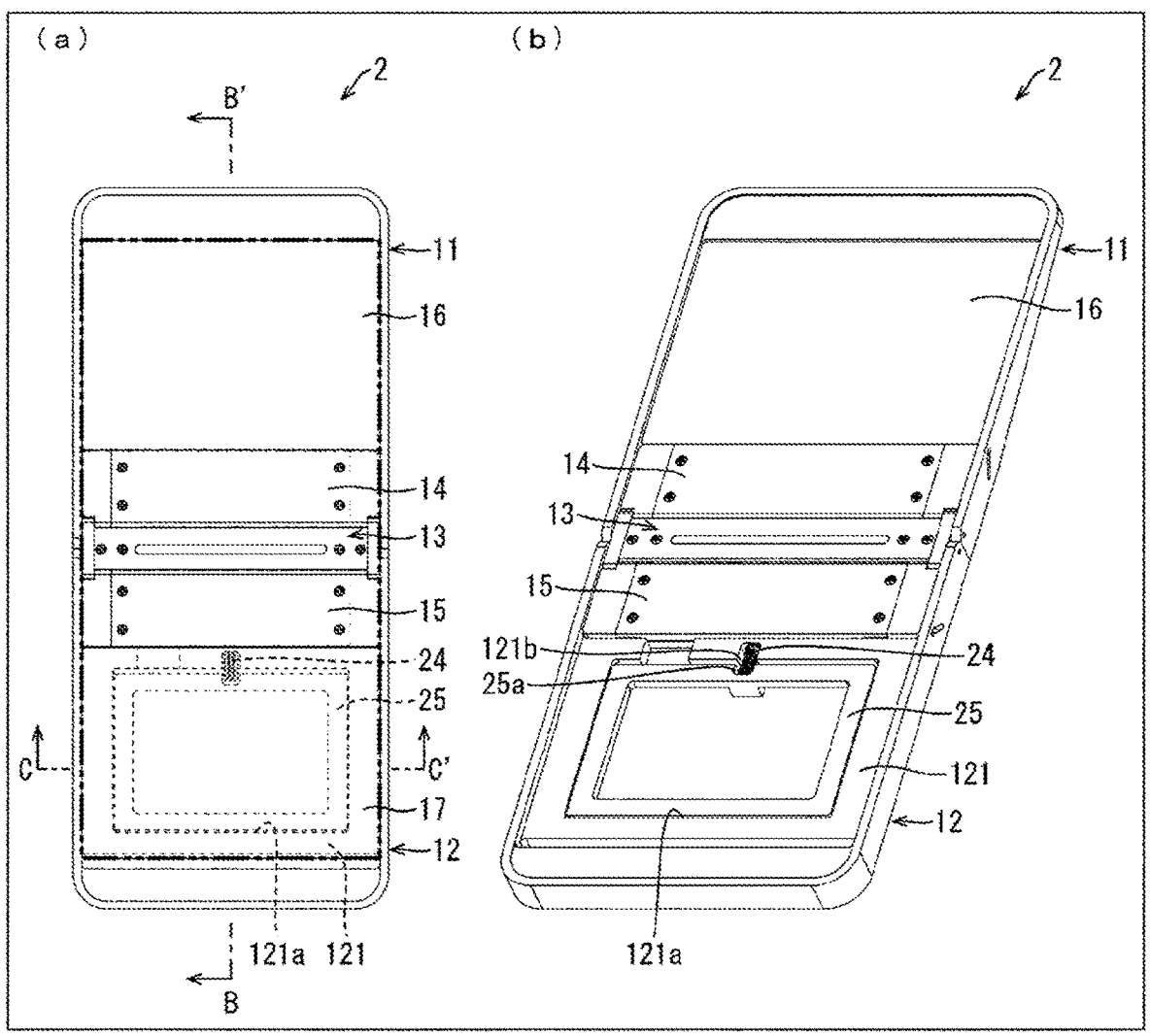
FIG. 7(a) is a plan view illustrating a schematic configuration of a housing unit according to a second embodiment, and (b) is a perspective view illustrating a state in which a second panel adhering plate is removed from the housing unit illustrated in (a).

(a) of FIG. 7 is a plan view illustrating a schematic configuration of a housing unit 2 according to the present embodiment, and (b) of FIG. 7 is a perspective view illustrating a state in which a second panel adhering plate 17 is removed from the housing unit 2 illustrated in (a) of FIG. 7. (a) of FIG. 8 is a cross-sectional view of the housing unit 2 illustrated in (a) of FIG. 7 taken along line B-B', and (b) of FIG. 8 is a cross-sectional view of the housing unit 2 illustrated in (a) of FIG. 7 taken along line C-C'.

Figure 8:
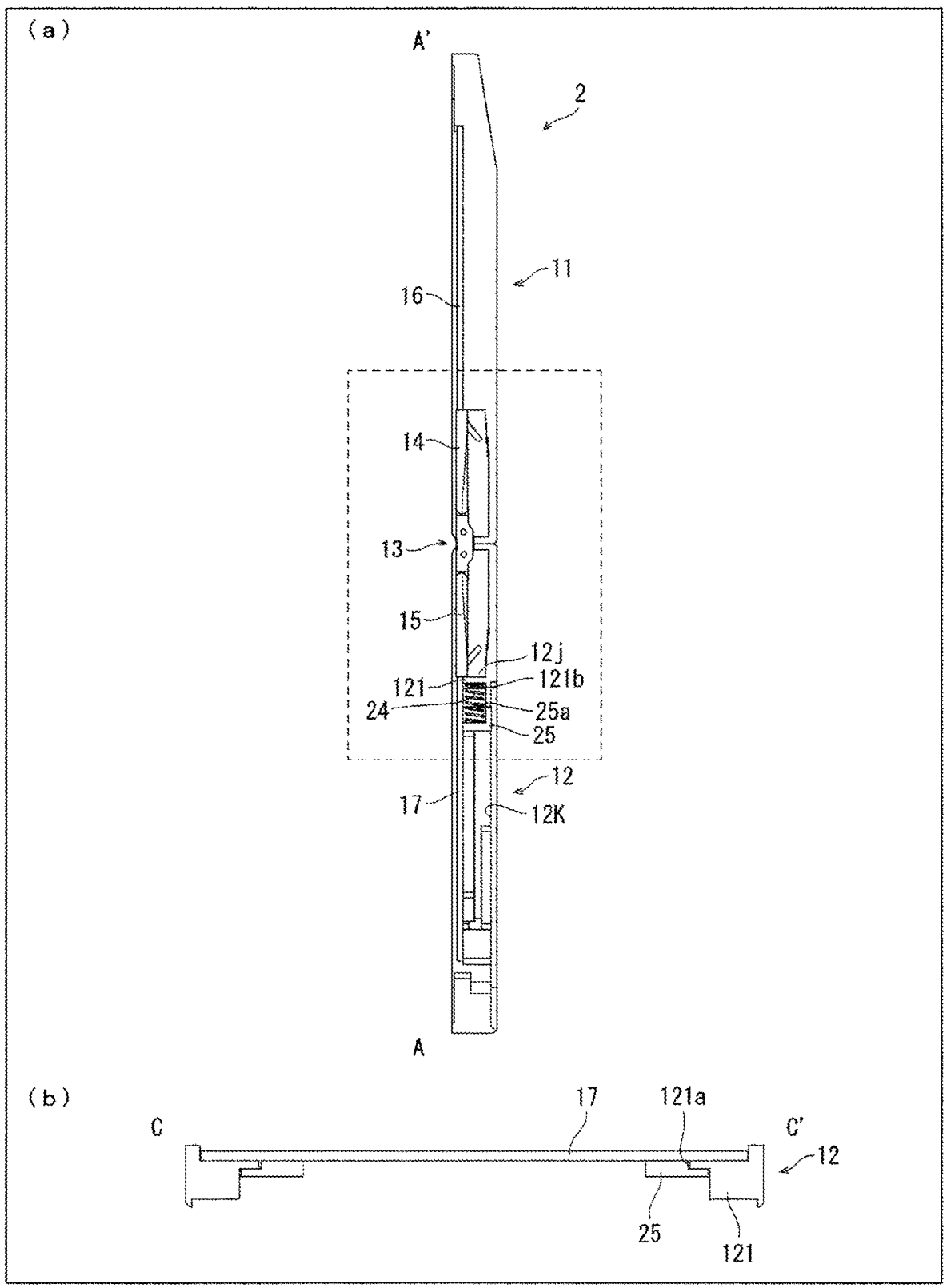
FIG. 8(a) is a cross-sectional view of the housing unit illustrated in (a) of FIG. 7 taken along line B-B', and (b) is a cross-sectional view of the housing unit illustrated in (a) of FIG. 7 taken along line C-C'.

As illustrated in (a) and (b) of FIG. 7 and (a) of FIG. 8, the display device 1 according to the present embodiment includes a spring 24, for example, as an elastic member, in a portion within the housing unit 2 that is not visible from the outside of the display device 1, specifically, between a back face of the second adhering plate 17 (in other words, a face of the second adhering plate 17 on the opposite side to the adhering surface of the display panel 3) and a face 12k of the second housing 12 facing the back face of the second adhering plate 17.

A holder member 25 that holds the spring 24 is attached to the back face of the second adhering plate 17. The holder member 25 is bonded to the second adhering plate 17 by, for example, an adhesive.

As illustrated in (a) and (b) of FIG. 7 and (a) and (b) of FIG. 8, the second housing 12 is provided with, for example, a frame-shaped wall body 121 having a groove portion 121a surrounding the holder member 25.

The spring 24 is arranged so as to expand and contract in a direction parallel to the adhering surface of the display panel 3 and perpendicular to the axis about which the housing unit 2 is folded, in the second adhering plate 17. A spring receiving portion 25a that comes into contact with one end portion of the spring 24 in the expanding/contracting direction is provided on a face of the holder member 25 facing the wall body 121 in a direction perpendicular to the axis about which the housing unit 2 is folded.

A spring receiving portion 121b that comes into contact with the other end portion in the expanding/contracting direction of the spring 24 is provided on a face of the wall body 121 facing the spring receiving portion 25a in a direction perpendicular to the axis about which the housing unit 2 is folded, so as to sandwich the spring 24 between the spring receiving portion 121b and the spring receiving portion 25a. Note that here the direction perpendicular to the axis about which the housing unit 2 is folded refers to a direction perpendicular to the axial direction of the shafts 18 to 23 (in other words, the longitudinal direction of the hinge member 13).

In (a) and (b) of FIG. 7 and (a) of FIG. 8, a case is illustrated as an example in which the spring receiving portion 25a is provided in a central portion of one end portion of the hinge member 13 side of both end portions of the holder member 25 which are parallel to the longitudinal direction of the hinge member 13, and the spring receiving portion 121b is provided in a center portion of a face facing the spring receiving portion 25a of one end portion on the hinge member 13 side (in other words, the end portion adjacent to the groove portion 12j) of both end portions of the wall body 121 which are parallel to the longitudinal direction of the hinge member 13.

However, the present embodiment is not limited thereto, and the spring receiving portion 25a may be provided on the other end portion of the holder member 25 that is parallel to the longitudinal direction of the hinge member 13 (that is, in (a) and (b) of FIG. 7, an end portion that faces the end portion where the spring receiving portion 25a is provided with the groove portion 121a therebetween). The number of spring receiving portions 25a and the contact area of the spring 24 in the spring receiving portion 25a are not particularly limited. In (a) and (b) of FIG. 7 and (a) of FIG. 8, a case is illustrated as an example in which the spring 24 is a compression coil spring, but the type of the spring 24 is not particularly limited.

The spring 24 is provided in compression on the second lifter 15 side such that the second adhering plate 17 and the second lifter 15 come into contact with each other in a state in which the housing unit 2 is deployed at 180 degrees. Specifically, in a state in which the housing unit 2 is deployed at 180 degrees, first, one end of the display panel 3 is attached to the first adhering plate 16, and then in a state in which the spring 24 is compressed such that the second adhering plate 17 and the second lifter 15 come into contact with each other, the other end of the display panel 3 on the opposite side to the one end described above is attached to the second adhering plate 17. For this reason, in a state in which the housing unit 2 is deployed at 180 degrees, the display panel 3 is provided with a tight tension between the first adhering plate 16 and the second adhering plate 17 so as to compress the spring 24, and the second adhering plate 17 on the movable side is pulled toward the first adhering plate 16 on the fixed side by the display panel 3 together with the spring 24. As such, the spring 24 has tension in a direction that pulls the second adhering plate 17 and the second lifter 15 apart from each other.

The width of the groove portion 121a in the direction perpendicular to the axis about which the housing unit 2 is folded is formed larger than the width of the holder member 25 in the same direction.

In a state in which the housing unit 2 is deployed at 180 degrees, a gap is provided between a face facing the holder member 25 at an end portion on the opposite side to the hinge member 13 of both end portions of the wall body 121 that are parallel to the longitudinal direction of the hinge member 13, and a face facing the wall body 121 at an end portion on the opposite side to the hinge member 13 of both end portions of the holder member 25 that are parallel to the longitudinal direction of the hinge member 13. Note that the gap is covered by the second adhering plate 17 in a plan view in a state in which the housing unit 2 is deployed at 180 degrees.

The holder member 25 is movable along the second housing 12 in a direction parallel to the adhering surface of the display panel 3 and perpendicular to the axis about which the housing unit 2 is folded in the second adhering plate 17, in the gap, by the expansion/contraction of the spring 24. Thus, the second adhering plate 17 is movable along the second housing 12 in a direction parallel to the adhering surface of the display panel 3 and perpendicular to the axis about which the housing unit 2 is folded, in the second adhering plate 17, by the expansion/contraction of the spring 24. Note that in the present embodiment, the first adhering plate 16 is fixed to the first housing 11.

As illustrated in (b) of FIG. 8, the holder member 25 is provided in contact with the wall body 121 of the second housing 12 at an end portion that is parallel to a direction perpendicular to the axis about which the housing unit 2 is folded. The holder member 25 slides smoothly with the wall body 121. The wall body 121 may be provided with a guide member that guides the holder member 25 in the direction perpendicular to the axis about which the housing unit 2 is folded, or may be provided with a slider that slides the holder member 25 in the direction perpendicular to the axis about which the housing unit 2 is folded.

Note that in the present embodiment, as described above, the holder member 25 is fixed to the second adhering plate 17 such that the second adhering plate 17 moves integrally with respect to the second housing 12, but the second adhering plate 17 and the holder member 25 may be integrally formed. In other words, the holder member 25 may be movable with respect to the second housing 12 by the second adhering plate 17 being integrated with the holder member 25 and the holder member 25 serving as the second adhering plate 17.

Next, effects of the display device 1 according to the present embodiment will be described below with reference to FIG. 9 to FIG. 14.

Figure 9:
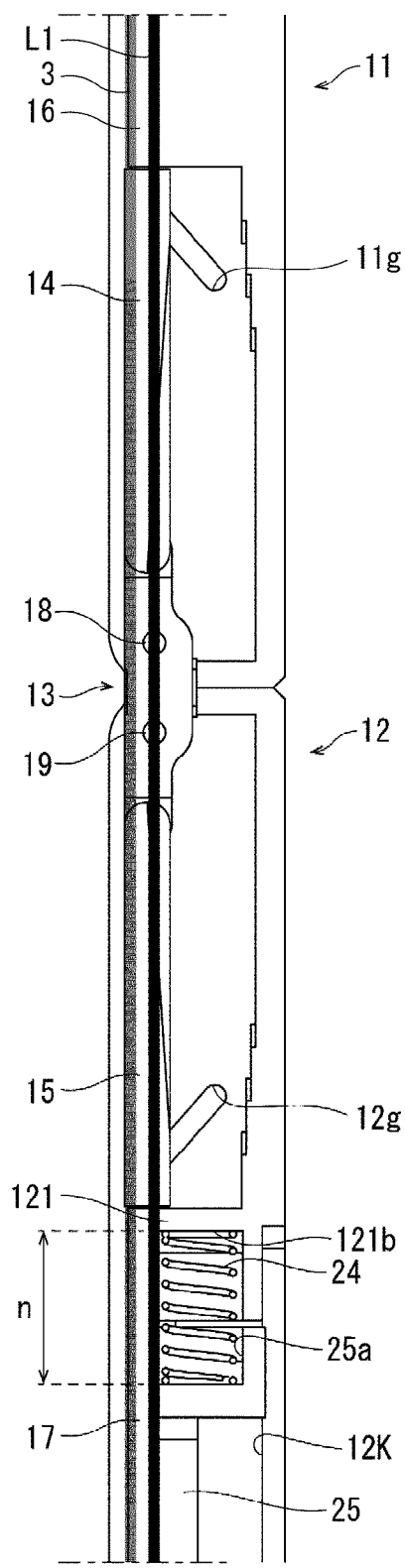
FIG. 9 is a cross-sectional view of main portions illustrating a relationship between a length of a display panel and a length of a face that passes over a first fulcrum and a second fulcrum and is parallel to a first housing and a second housing in a state in which the housing unit according to the second embodiment is deployed at 180 degrees.
Figure 10:
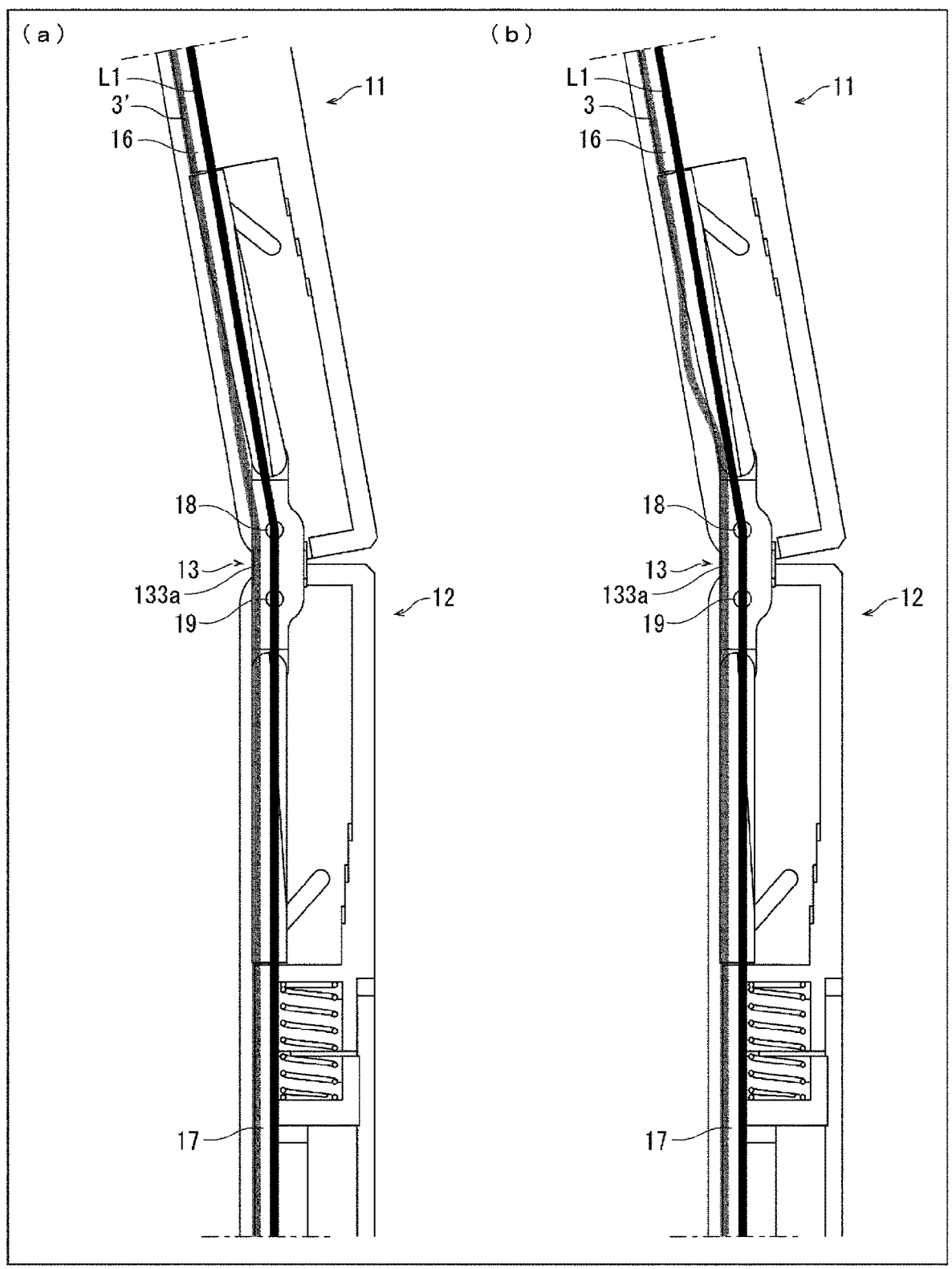
FIG. 10(a) is a cross-sectional view of main portions illustrating a relationship between a length of an adhering surface of the display panel and a length of the face that passes over the first fulcrum and the second fulcrum and is parallel to the first housing and the second housing when the housing unit according to the second embodiment is started to be folded, and (b) is a cross-sectional view of main portions illustrating a state indicating a relationship between a length of the display panel and a length of the face that passes over the first fulcrum and the second fulcrum and is parallel to the first housing and the second housing when the housing unit is started to be folded in a state in which a first panel adhering plate and the second panel adhering plate are fixed to the corresponding first housing and the second housing.
Figure 11:
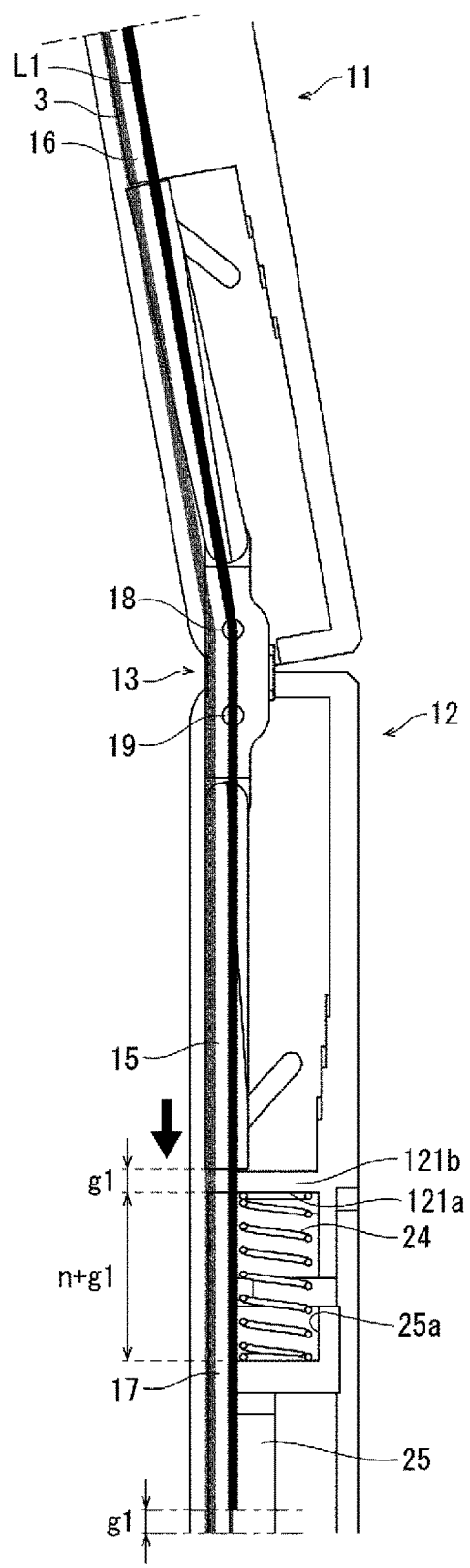
FIG. 11 is a cross-sectional view of main portions illustrating a relationship between a length of the display panel and a length of the face that passes over the first fulcrum and the second fulcrum and is parallel to the first housing and the second housing when the housing unit is started to be folded in the display device according to the second embodiment.
Figure 12:
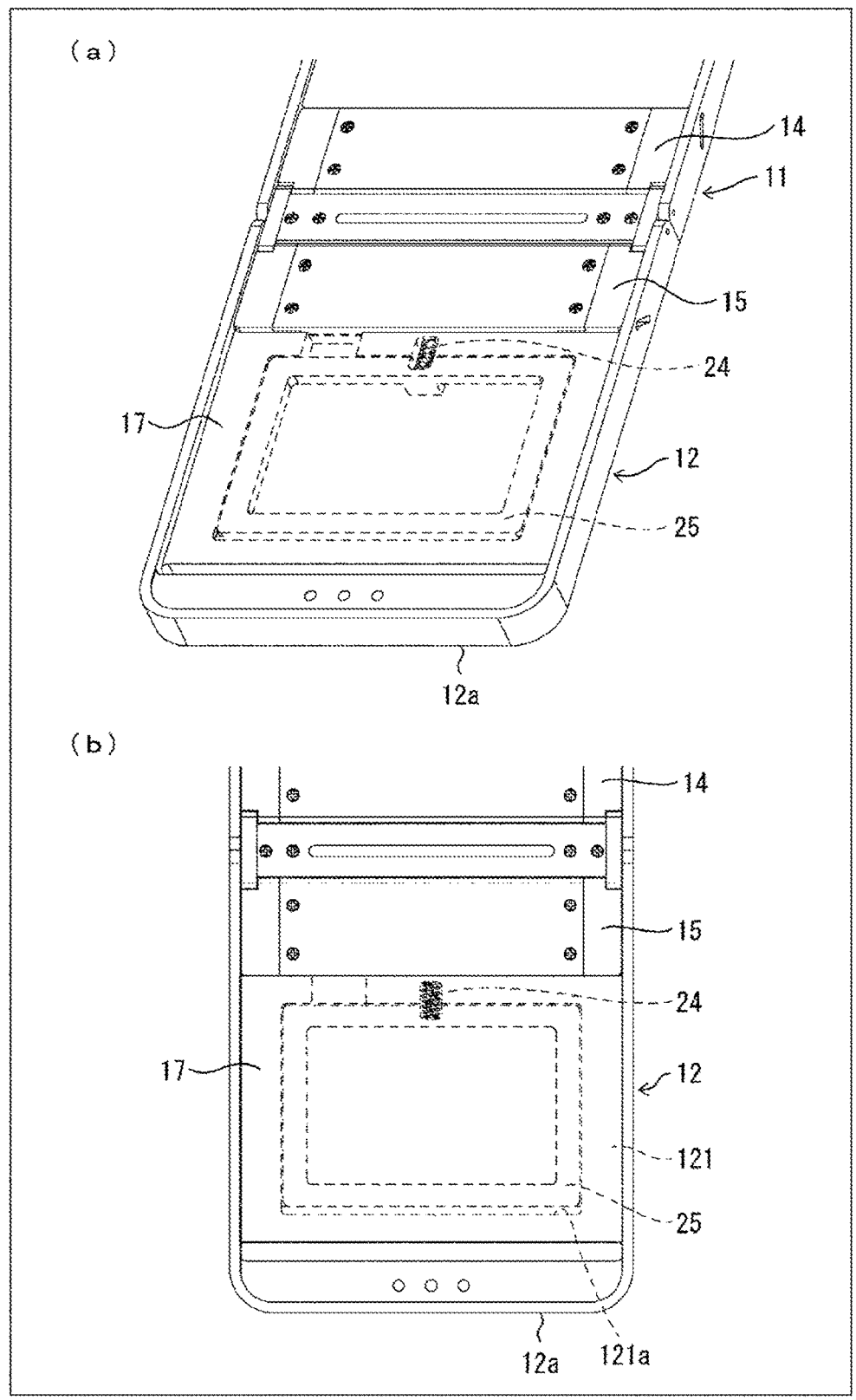
FIG. 12(a) is a perspective view of main portions illustrating a schematic configuration of the housing unit according to the second embodiment in a state in which the housing unit is deployed at 180 degrees, and (b) is a plan view illustrating a schematic configuration of the housing unit in a state in which the housing unit is deployed at 180 degrees.
Figure 13:
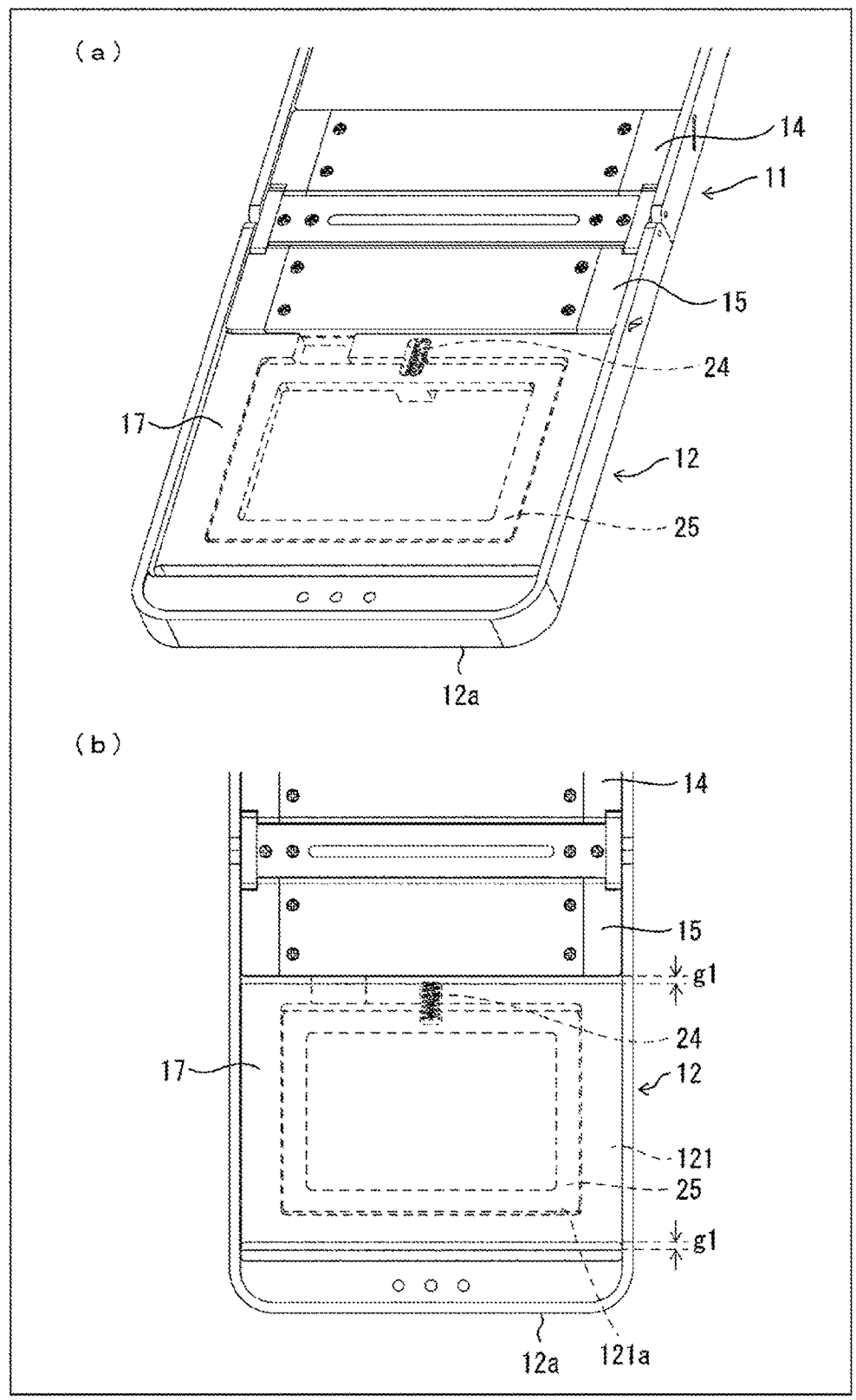
FIG. 13(a) is a perspective view of main portions illustrating a schematic configuration of the housing unit according to the second embodiment when the housing unit is started to be folded, and (b) is a plan view illustrating a schematic configuration of the housing unit when the housing unit according to the second embodiment is started to be folded.

FIG. 9 is a cross-sectional view of main portions illustrating a relationship between a length of the display panel 3 and a length of a face L1 that passes over the shafts 18 and 19 and is parallel to the first housing 11 and the second housing 12 in a state in which the housing unit 2 is deployed at 180 degrees. (a) of FIG. 10 is a cross-sectional view of main portions illustrating a relationship between a length of an adhering surface 3' of the display panel 3 and a length of the face L1 that passes over the shafts 18 and 19 and is parallel to the first housing 11 and the second housing 12 when the housing unit 2 is started to be folded, and (b) of FIG. 10 is a cross-sectional view of main portions illustrating a relationship between a length of the display panel 3 and a length of the face L1 that passes over the shafts 18 and 19 and is parallel to the first housing 11 and the second housing 12 when the housing unit 2 is started to be folded in a state in which the first panel adhering plate 16 and the second panel adhering plate 17 are fixed to the corresponding first housing 11 and the second housing 12. FIG. 11 is a cross-sectional view of main portions illustrating a relationship between a length of the display panel 3 and a length of the face L1 that passes over the shafts 18 and 19 and is parallel to the first housing 11 and the second housing 12 when the housing unit 2 is started to be folded in the display device 1 according to the present embodiment. (a) of FIG. 12 is a perspective view of main portions illustrating a schematic configuration of the housing unit 2 in a state in which the housing unit 2 is deployed at 180 degrees, and (b) of FIG. 12 is a plan view illustrating a schematic configuration of the housing unit 2 in a state in which the housing unit 2 is deployed at 180 degrees. (a) of FIG. 13 is a perspective view of main portions illustrating a schematic configuration of the housing unit 2 when the housing unit 2 is started to be folded, and (b) of FIG. 13 is a plan view illustrating a schematic configuration of the housing unit 2 when the housing unit 2 is started to be folded.

Note that all of FIG. 9 to FIG. 11 are enlarged cross-sectional views of main portions illustrating the portion surrounded and indicated by dashed lines in (a) of FIG. 8, and all of the length of the display panel 3, the length of the adhering surface of the display panel 3, and the length of the face L1 between dot-dash lines illustrated in FIG. 9 to FIG. 11 correspond to the length of the display panel 3, the length of the adhering surface of the display panel 3, and the length of the face L1 of the portion which is surrounded and indicated by the dashed lines in (a) of FIG. 8. Note that the face L1 is a virtual face, and the length of the face L1 is a virtual length of the face L1.

In a state in which the housing unit 2 is deployed at 180 degrees, the length of the display panel 3 between the dot-dash lines illustrated in FIG. 9 and the length of the face L1 are the same. Note that, in this way, in a state in which the housing unit 2 is deployed at 180 degrees, the length of the adhering surface 3' of the display panel 3 in the housing unit 2 and the length of the actual display panel 3 illustrated by the chain double-dashed line in (a) of FIG. 7 are the same.

Meanwhile, in a state in which the housing unit 2 is folded, the hinge member 13 is disposed further outward than the display panel 3. In other words, in a state in which the housing unit 2 is folded, the face L1 that passes over the shafts 18 and 19 and is parallel to the first housing 11 and the second housing 12 is disposed further outward than the adhering surface 3' of the display panel 3. Thus, when the housing unit 2 is started to be folded from a state in which the housing unit 2 is deployed at 180 degrees, the length of the adhering surface 3' of the display panel 3 between dot-dash lines illustrated in (a) of FIG. 10 becomes shorter than the length of the face L1. Thus, in a case where the first panel adhering plate 16 and the second panel adhering plate 17 are fixed to the corresponding first housing 11 and second housing 12, respectively, when the housing unit 2 is started to be folded from a state in which the housing unit 2 is deployed at 180 degrees, the display panel 3 becomes longer than the adhering surface 3' of the display panel 3 between the first panel adhering plate 16 and the second panel adhering plate 17, and the display panel 3 includes an excess with respect to the adhering surface 3' of the display panel 3, and a deflection occurs in the display panel 3, as illustrated in (b) of FIG. 10. Note that the length of the display panel 3 between the dot-dash lines illustrated in (b) of FIG. 10 and the length of the face L1 are the same length as the display panel 3 flexes.

However, according to the present embodiment, as described above, the spring 24 is pulled by the display panel 3 in a state in which the housing unit 2 is deployed at 180 degrees and is provided in compression on the second lifter 15 side such that the second adhering plate 17 and the second lifter 15 are in contact with each other, and has tension in a direction that pulls the second adhering plate 17 and the second lifter 15 apart from each other (elastic force, that is, a force that tries to return to the original position).

As a result, when the housing unit 2 is started to be folded from a state in which the housing unit 2 is deployed at 180 degrees, the tension applied to the display panel 3 is weakened, and the tension applied to the spring 24 is weakened by beginning to flex from a tight state. As a result, the spring 24 extends in a direction that pulls the second adhering plate 17 and the second lifter 15 apart from each other. As a result, by the holder member 25 being pressed in the downward direction in FIG. 11 and (b) of FIG. 13 (in other words, in the direction of the sidewall 12a in the second housing 12) by the spring 24, the holder member 25 moves along the second housing 12 in a direction that pulls the second adhering plate 17 and the second lifter 15 apart from each other together with the second adhering plate 17. At this time, an elastic force is exerted by the spring 24 between the second adhering plate 17 and the second housing 12. At this time, by the holder member 25 moving within the groove portion 121a of the wall body 121, the wall body 121 functions as a regulating member that regulates the range of movement of the second adhering plate 17 and the holder member 25.

As illustrated in FIG. 9, in a state in which the housing unit 2 is deployed at 180 degrees, the spring 24 is compressed to a length n in a direction perpendicular to the axis about which the housing unit 2 is folded. From this state, as illustrated in FIG. 11, when the second adhering plate 17 and the holder member 25 are moved by a distance g1 in the direction perpendicular to the axis about which the housing unit 2 is folded so as to pull the second adhering plate 17 and the second lifter 15 apart from each other, the spring 24 extends between the spring receiving portion 25a and the spring receiving portion 121b such that the length in the direction perpendicular to the axis about which the housing unit 2 is folded is n+g1.

In this way, by the display panel 3 extending in the downward direction illustrated in FIG. 11 along the second housing 12, the deflection of the display panel 3 is eliminated. The display panel 3 is attached to the first adhering plate 16 and the second adhering plate 17, and the spring 24 presses down the second adhering plate 17 in the downward direction in FIG. 11 by the deflection of the display panel 3 between the first adhering plate 16 and the second adhering plate 17. Thus, the distance g1 corresponds to the length of the deflection of the display panel 3. That is, in the present embodiment, in a state in which the housing unit 2 is folded as illustrated in FIG. 11, by the display panel 3 extending by the length of the deflection in the downward direction in FIG. 11 (the length corresponding to the distance g1), the length of the face L1 between dot-dash lines illustrated in FIG. 11 and the length of the display panel 3 extending in the downward direction in FIG. 11 by the distance g1 illustrated in FIG. 11 (the length of the display panel 3 between the dot-dash line on the upper end side and the chain double-dashed line on the lower end side in FIG. 11) are the same.

Note that in the present embodiment, as illustrated in (a) and (b) of FIG. 13, when the second adhering plate 17 is moved by the distance g1 from the state illustrated in (a) and (b) of FIG. 12 toward the downward direction in (b) of FIG. 13, an end portion on an opposite side to the hinge member 13 of both end portions that are parallel to the longitudinal direction of the hinge member 13 in the second adhering plate 17 protrudes toward the sidewall 12a side by the distance g1 from an end portion on an opposite side to the hinge member 13 of both end portions that are parallel to the longitudinal direction of the hinge member 13 in the wall body 121. Meanwhile, in the second adhering plate 17, an end portion on the hinge member 13 side of both end portions that are parallel to the longitudinal direction of the hinge member 13 moves from an end portion of the second lifter 15 facing the end portion toward the sidewall 12a side by the distance g1, and a gap is created between the second adhering plate 17 and the second lifter 15 by the distance g1. However, this gap is covered by the display panel 3 and is not viewed. This gap (in other words, the amount of movement of the second adhering plate 17) is not greater than 1 mm, and the display panel 3 can be sufficiently touched even in a case where the housing unit 2 is in the middle of being folded, for example, at 90 degrees, or stopped in a state of opening at 135 degrees.

In accordance with the present embodiment, in this way, the second adhering plate 17 is movable along the second housing 12 in a direction parallel to the adhering surface of the display panel 3 and perpendicular to the axis about which the housing unit 2 is folded, and when the housing unit 2 is folded, by moving the second adhering plate 17 and the second lifter 15 in the direction of pulling apart from each other, the display panel 3 attached to the second adhering plate 17 is pulled in the direction of movement of the second adhering plate 17, and a deflection as illustrated in (b) of FIG. 10 does not occur.

When the housing unit 2 is going to be opened from a state in which the housing unit 2 is folded and closed such that the display panel 3 is in the folded state, by the second adhering plate 17 being pulled with the display panel 3 attached to the first adhering plate 16 and moved toward the second lifter 15 side (in other words, the direction in which the second adhering plate 17 and the second lifter 15 come closer), the spring 24 is compressed again.

Note that, in the present embodiment as well, as illustrated in FIG. 9, the hinge member 13, the first lifter 14, the second lifter 15, the first adhering plate 16, and the second adhering plate 17 are aligned so as to be on the same plane in a state in which the housing unit 2 is deployed at 180 degrees such that the display panel 3 is deployed at 180 degrees. Due to the opening/closing operation of the housing unit 2, the hinge member 13, the first lifter 14, the second lifter 15, the first adhering plate 16, and the second adhering plate 17 move as illustrated in (a) to (e) of FIG. 5.

Figure 14:
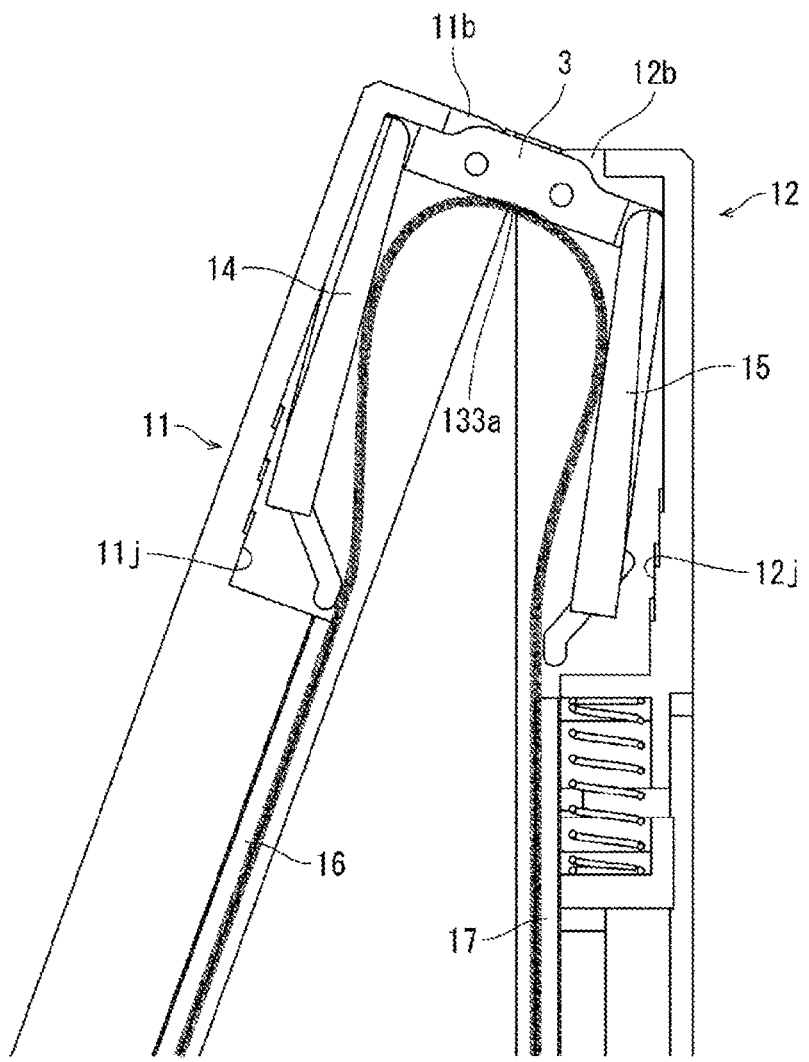
FIG. 14 is a cross-sectional view illustrating a schematic configuration of main portions of the display device just before the housing unit according to the second embodiment is completely closed.

FIG. 14 is a cross-sectional view illustrating a schematic configuration of main portions of the display device 1 just before closing the housing unit 2.

As illustrated in FIG. 14, in accordance with the present embodiment, just before closing the housing unit 2, the display panel 3 is going to open outward with a repelling force against the spring 24. However, according to the present embodiment, in a space enclosed by the hinge member 13, the first lifter 14, and the second lifter 15 between the first housing 11 and the second housing 12 (specifically, in the space enclosed by the groove portion 11j and the groove portion 12j), the difference between the length of the adhering surface 3' of the display panel 3 and the length of the face L1 that passes over the shafts 18 and 19 and is parallel to the first housing 11 and the second housing 12 can be absorbed. As a result, in the present embodiment as well, the bulge of the folded portion of the display panel 3 can be accommodated in the space enclosed by the hinge member 13, the first lifter 14, and the second lifter 15.

Figure 15:
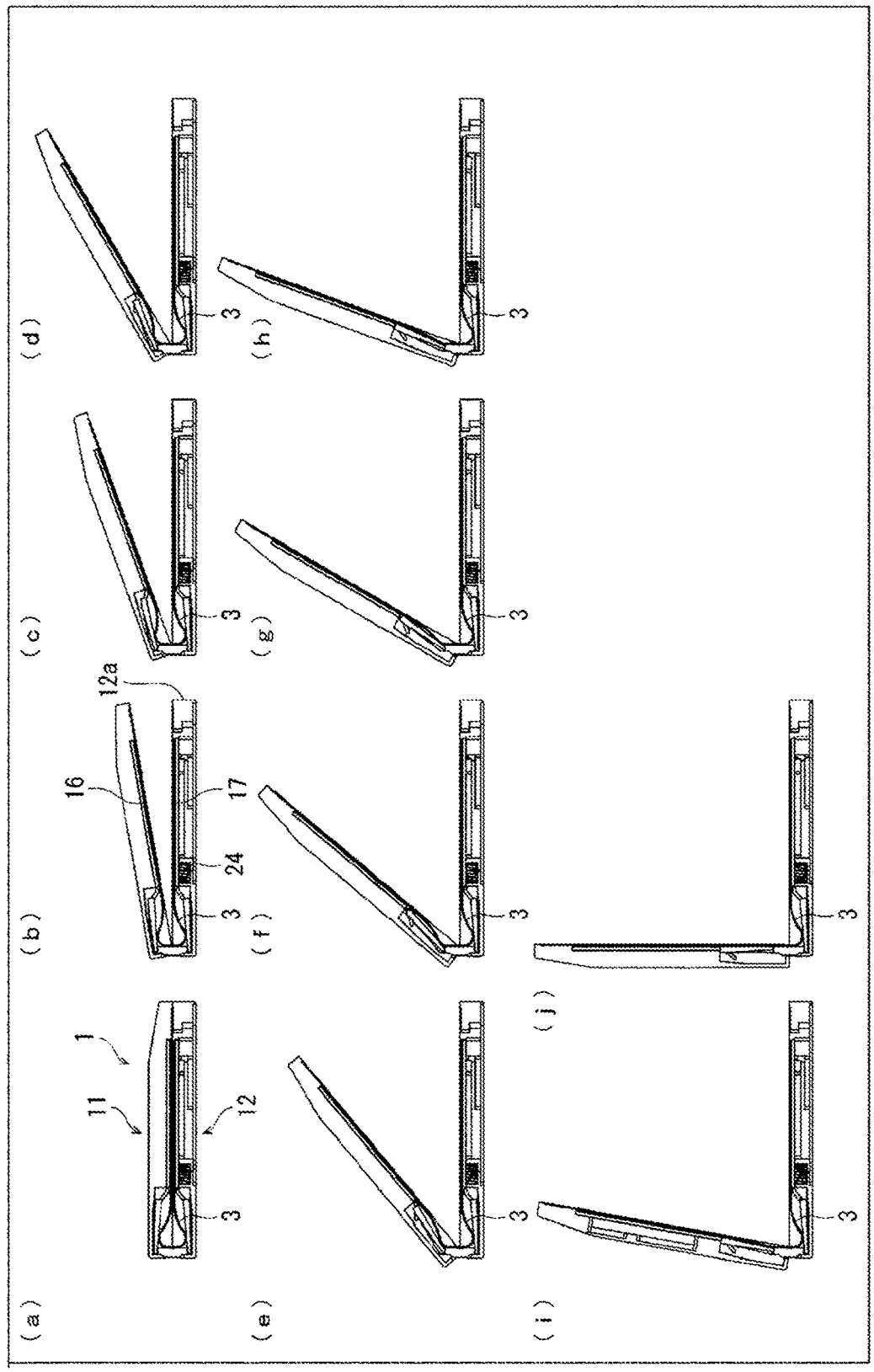
FIG. 15(a) to (j) are diagrams schematically illustrating the shapes of the display panel associated with the opening/closing operation of the housing unit according to the second embodiment, and changes in a relationship between a hinge member, a first lifter, and a second lifter.

(a) to (j) of FIG. 15 are diagrams schematically illustrating the shapes of the display panel 3 associated with the opening/closing operation of the housing unit 2 according to the present embodiment, and changes in the relationship between the hinge member 13, the first lifter 14, and the second lifter 15.

As illustrated in (a) to (j) of FIG. 15, according to the present embodiment, when the housing unit 2 is folded, by moving the second adhering plate 17 and the second lifter 15 in the direction of pulling apart from each other, the display panel 3 attached to the second adhering plate 17 is pulled in the direction of movement of the second adhering plate 17, and a deflection on the display panel 3 does not occur. Thus, according to the present embodiment, touch operation on the display panel 3 is sufficiently possible even in the middle of being folded as described above.

Third Embodiment

A description follows regarding differences from the first and second embodiments in the present embodiment.

Figure 16:
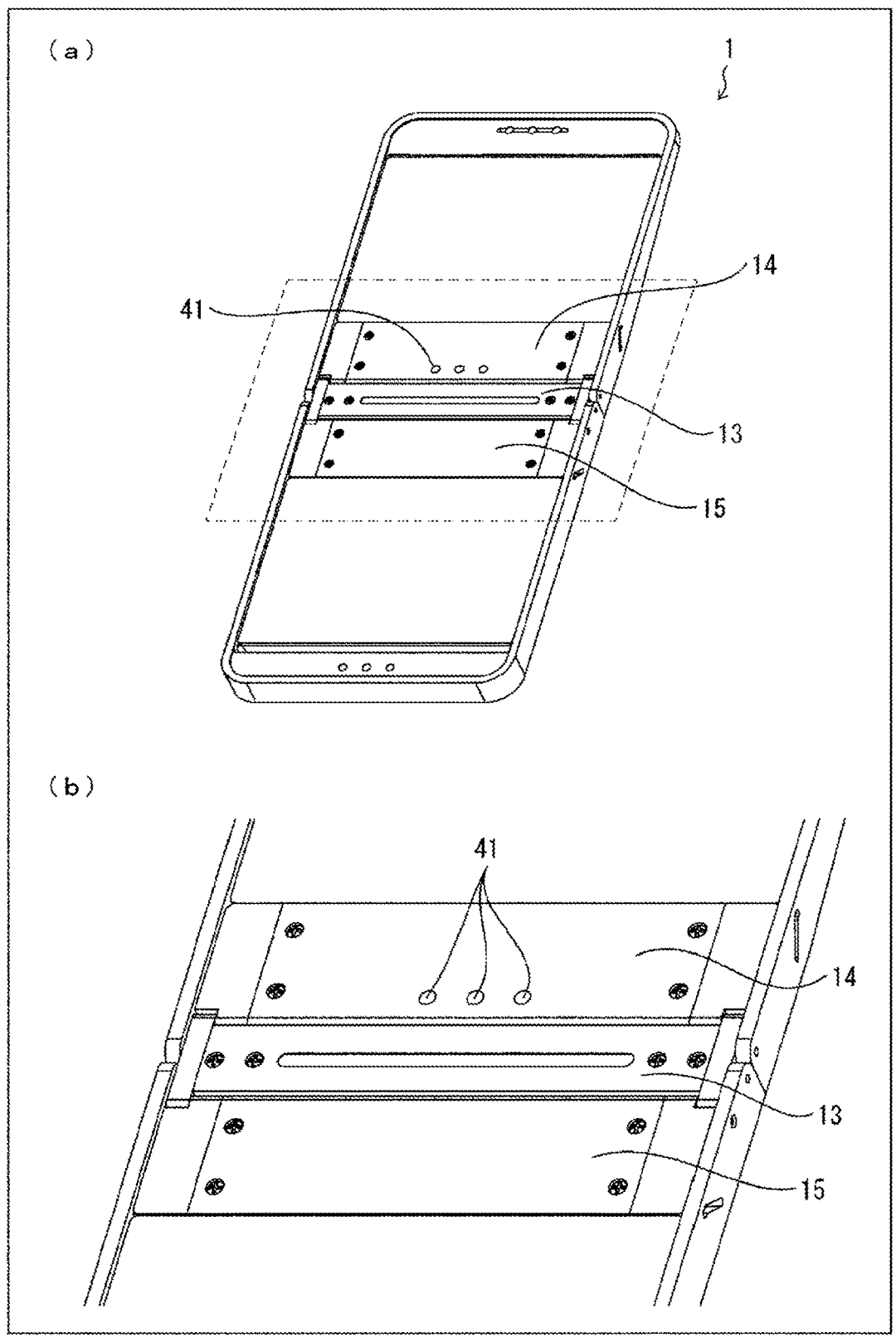
FIG. 16(a) is a perspective view illustrating a schematic configuration of a housing unit according to a third embodiment, and (b) is an enlarged perspective view of main portions illustrating a configuration at and near a hinge member of the housing unit illustrated in (a).
Figure 17:
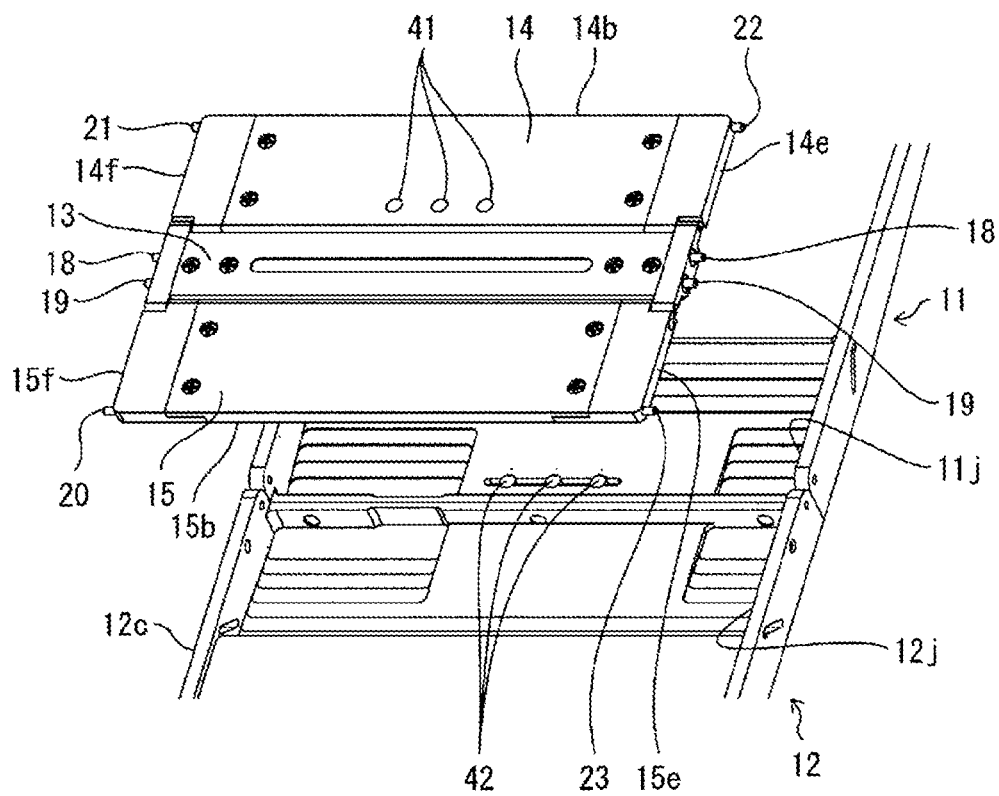
FIG. 17 is an exploded perspective view illustrating a configuration at and near the hinge member of the housing unit illustrated in (a) of FIG. 16.
Figure 18:
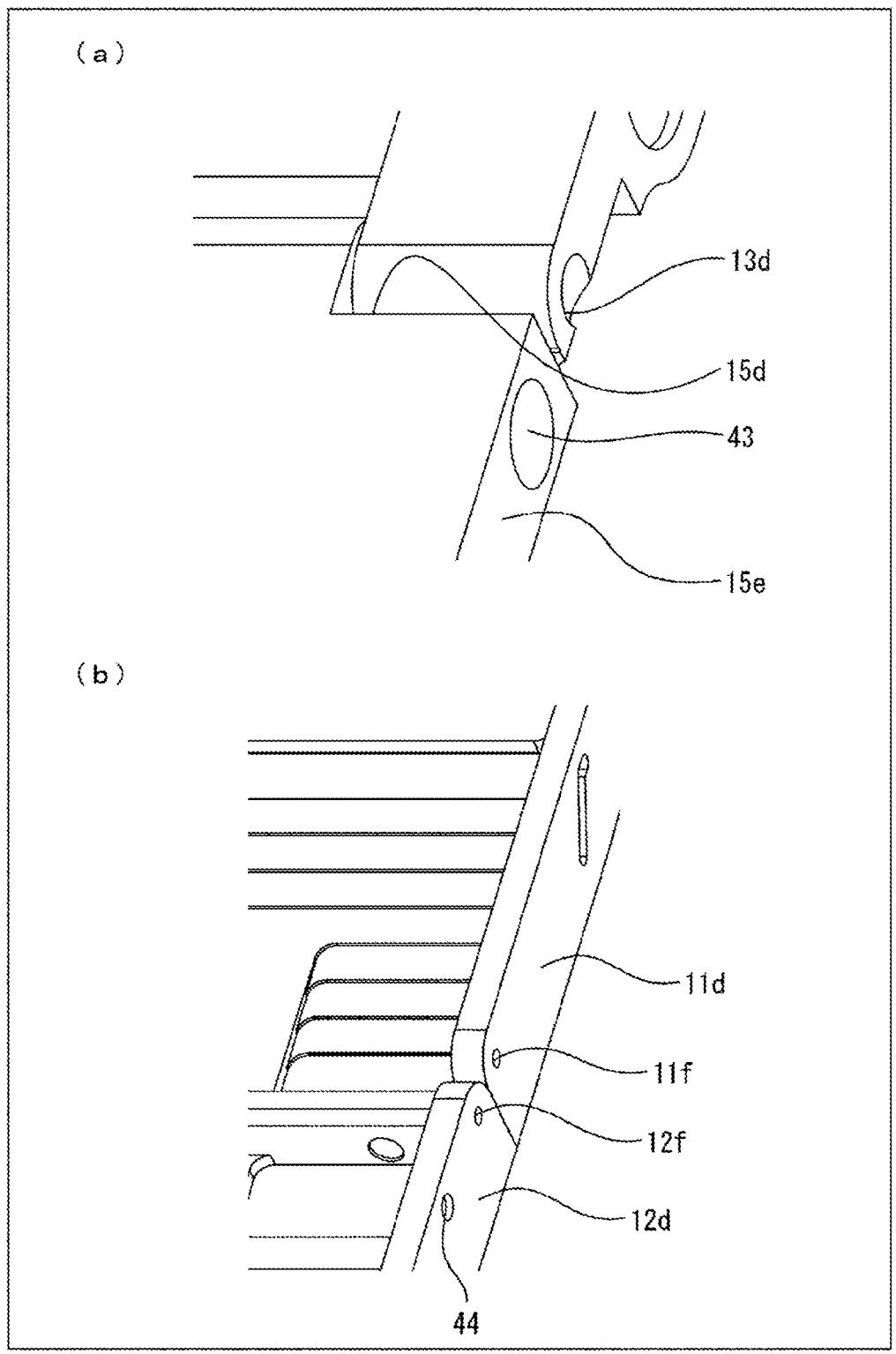
FIG. 18(a) is an enlarged perspective view of main portions illustrating a portion surrounded and indicated by dashed lines in FIG. 17, and (b) is an enlarged perspective view of main portions illustrating a portion surrounded and indicated by dot-dash lines in FIG. 17.

(a) of FIG. 16 is a perspective view illustrating a schematic configuration of a housing unit 2 according to the present embodiment, and (b) of FIG. 16 is an enlarged perspective view of main portions illustrating a configuration at and near a hinge member 13 of the housing unit 2 illustrated in (a) of FIG. 16. FIG. 17 is an exploded perspective view illustrating a configuration at and near the hinge member 13 of the housing unit 2 illustrated in (a) of FIG. 16. (a) of FIG. 18 is an enlarged perspective view of main portions illustrating a portion surrounded and indicated by dashed lines in FIG. 17, and (b) of FIG. 18 is an enlarged perspective view of main portions illustrating a portion surrounded and indicated by dot-dash lines in FIG. 17.

As illustrated in (a) and (b) of FIG. 16 and FIG. 17, the housing unit 2 according to the present embodiment includes a magnet 41 disposed on a face of the first lifter 14 on the opposite side to the face facing the display panel 3, and a magnet 42 disposed on a face of the first housing 11 facing the face on the opposite side to the face facing the display panel 3 in the first lifter 14 (that is, a face of the groove portion 11j on the bottom portion 12e side of the second housing 12).

The magnet 41 and the magnet 42 are mutually aligned and mutually attracted in a state in which the housing unit 2 is folded and closed such that the display panel 3 is in a folded state. As a result, the first housing 11 and the first lifter 14 are attracted by the magnetic force in a state in which the housing unit 2 is folded and closed as described above.

The magnet 41 and the magnet 42 function as a first retention mechanism that retains the positional relationship between the hinge member 13 and the first housing 11 as well as the positional relationship between the hinge member 13 and the first lifter 14 when the housing unit 2 is going to be opened from a state in which the housing unit 2 is folded and closed such that the display panel 3 is in the folded state.

As illustrated in FIG. 17 and (a) and (b) of FIG. 18, the housing unit 2 according to the present embodiment is configured such that a magnet 43 is disposed on the side surface 15e facing the sidewall 12d of the second housing 12 (the side surface of the second housing 12) in the second lifter 15, and a magnet 44 is disposed on the sidewall 12d of the second housing 12 facing the side surface 15e. Note that, although not illustrated, the magnet 43 is also disposed on the side surface 15f facing the sidewall 12c of the second housing 12 (the side surface of the second housing 12) in the second lifter 15, and the magnet 44 is also disposed on the sidewall 12c of the second housing 12 facing the side surface 15f. Note that the sidewall 12c and the sidewall 12d of the second housing 12 are formed so as to be symmetrical with respect to a plane, and the side surface 15e and the side surface 15f of the second lifter 15 are formed so as to be symmetrical with respect to a plane.

The magnet 43 and the magnet 44 are mutually aligned and mutually attracted in a state in which the housing unit 2 is open such that the display panel 3 is in an open state at 180 degrees. Thus, in a state in which the housing unit 2 is open at 180 degrees as described above, the second housing 12 and the second lifter 15 are attracted by the magnetic force.

The magnet 43 and the magnet 44 function as a second retention mechanism that retains the positional relationship between the hinge member 13 and the second housing 12 as well as the positional relationship between the hinge member 13 and the second lifter 15 when the housing unit 2 is going to be closed from a state in which the housing unit 2 is open such that the display panel 3 is in an open state at 180 degrees.

As described in the first and second embodiments, the hinge member 13, the first lifter 14, the second lifter 15, the first adhering plate 16, and the second adhering plate 17 are aligned so as to be on the same plane in a state in which the housing unit 2 is deployed at 180 degrees such that the display panel 3 is deployed at 180 degrees. Thus, the magnet 43 is arranged so as to be disposed on the same plane with the shafts 18 to 24 in a state in which the housing unit 2 is deployed at 180 degrees. The magnet 44 is arranged so as to be aligned with the hole 11f and 12f on a straight line on the same horizontal plane as the horizontal plane in which the holes 11f and 12f are provided, in a state in which the housing unit 2 is deployed at 180 degrees.

Figure 19:
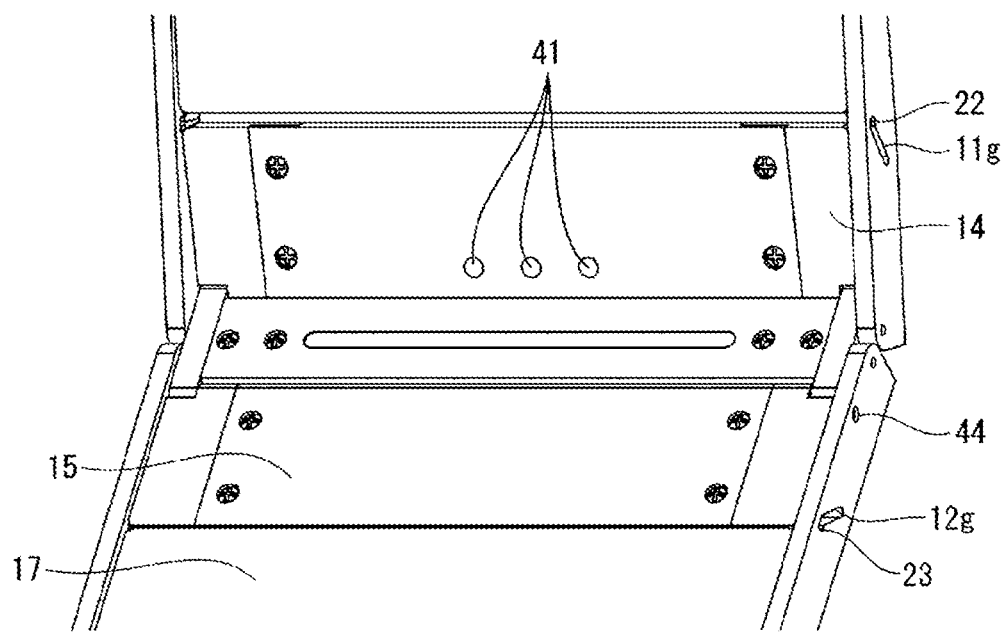
FIG. 19 is a perspective view illustrating a positional relationship between the hinge member and a second housing and a positional relationship between the hinge member and a second lifter when the housing unit according to the third embodiment is going to be closed from a state in which the housing unit is deployed at 180 degrees.

FIG. 19 is a perspective view illustrating the positional relationship between the hinge member 13 and the second housing 12 and the positional relationship between the hinge member 13 and the second lifter 15 when the housing unit 2 is going to be closed from the state in which the housing unit 2 is deployed at 180 degrees.

As described above, the magnet 43 and the magnet 44 are mutually aligned and mutually attracted in a state in which the housing unit 2 is deployed at 180 degrees such that the display panel 3 is deployed at 180 degrees. Therefore, as illustrated in FIG. 19, when the housing unit 2 is going to be closed from a state in which the housing unit 2 is deployed at 180 degrees, the magnet 44 and the magnet 43 (see (a) of FIG. 18) are attracted to each other, and relative movement between the second lifter 15 and the second housing 12 is restricted.

Meanwhile, as described above, since the magnet 42 is provided on the face of the groove portion 11j on the bottom portion 12e side of the second housing 12, the magnet 41 and the magnet 42 are spaced apart from each other in a state in which the housing unit 2 is deployed at 180 degrees, and the first lifter 14 is in a state of being released from the magnetic force without being attracted to the first housing 11 by the magnetic force.

Thus, when the housing unit 2 is going to be closed from a state in which the housing unit 2 is deployed at 180 degrees, since the magnet 44 and the magnet 43 are attracted to each other, the second lifter 15 does not move immediately, and the positional relationship between the hinge member 13 and the second housing 12 and the positional relationship between the hinge member 13 and the second lifter 15 are retained. As a result, the shaft 23 is disposed at the upper end of the link groove 12g, such that the shaft 22 slides within the link groove 11g while the second lifter 15 and the hinge member 13 is kept in a state of being aligned on the same plane, and the first lifter 14 and the hinge member 13 move relative to each other before the second lifter 15 and the hinge member 13 move relative to each other.

Figure 20:
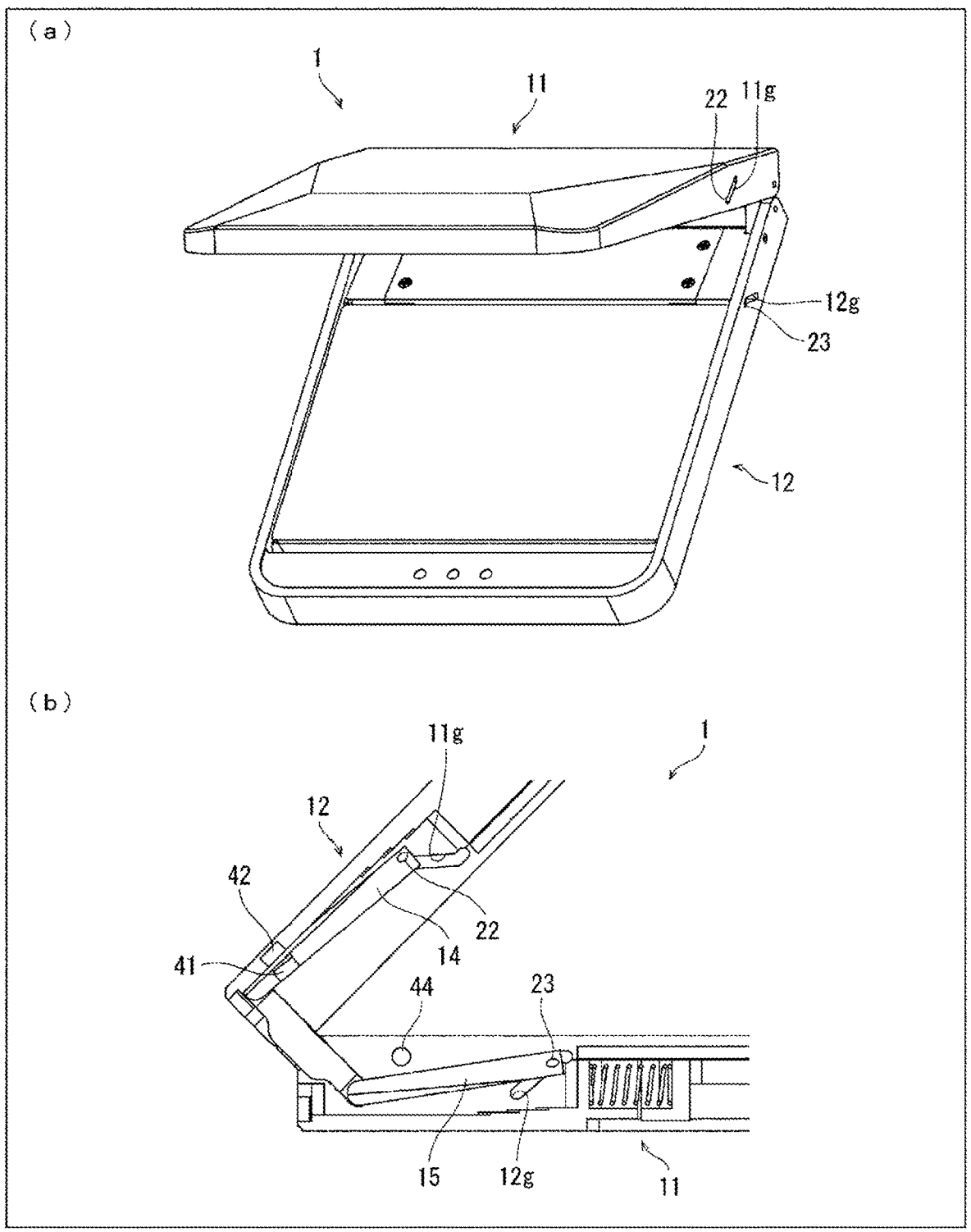
FIG. 20(a) is a perspective view illustrating the positional relationship between the hinge member and the second lifter when the housing unit according to the third embodiment is going to be closed from the state in which the housing unit is deployed at 180 degrees, and (b) is a cross-sectional view illustrating a positional relationship between the hinge member and the second housing and a positional relationship between the hinge member and the second lifter when the housing unit according to the third embodiment is going to be closed from the state in which the housing unit is deployed at 180 degrees.

(a) of FIG. 20 is a perspective view illustrating the positional relationship between the hinge member 13 and the second lifter 15 when the housing unit 2 is going to be closed from the state in which the housing unit is deployed at 180 degrees, and (b) of FIG. 20 is a cross-sectional view illustrating the positional relationship between the hinge member 13 and the second housing 12 and the positional relationship between the hinge member 13 and the second lifter 15 when the housing unit 2 is going to be closed from the state in which the housing unit is deployed at 180 degrees.

As described above, the magnet 41 and the magnet 42 are mutually aligned and mutually attracted in a state in which the housing unit 2 is folded and closed such that the display panel 3 is in a folded state. Thus, as illustrated in (a) and (b) of FIG. 20, when the housing unit 2 is going to be opened from a closed state as described above, the magnet 41 and the magnet 42 are attracted to each other, and relative movement between the first lifter 14 and the first housing 11 is restricted.

Meanwhile, as described above, the magnet 43 is arranged on the same plane as the shafts 18 to 24 in a state in which the housing unit 2 is deployed at 180 degrees, while the magnet 44 is arranged on the same horizontal plane as the horizontal plane in which the holes 11f and 12f are provided so as to be aligned with the holes 11f and 12f on a straight line in a state in which the housing unit 2 is deployed at 180 degrees. Thus, in a state in which the housing unit 2 is folded and closed such that the display panel 3 is in the folded state, the magnet 41 and the magnet 42 are disposed at different heights, and the second lifter 15 is in a state of being released from the magnetic force without being attracted to the second housing 12 by the magnetic force.

Thus, when the housing unit 2 is going to be opened from a state in which the housing unit 2 is folded as described above, since the magnet 41 and the magnet 43 are attracted to each other, the first lifter 14 does not move immediately, and the positional relationship between the hinge member 13 and the first housing 11 and the positional relationship between the hinge member 13 and the first lifter 14 are retained. As a result, the shaft 23 slides within the link groove 12g while the shaft 22 remains disposed at the lower end of the link groove 11g (in other words, the second lifter 15 and the hinge member 13 move relative to each other before the first lifter 14 and the hinge member 13 move relative to each other), and the second lifter 15 and the hinge member 13 are aligned on the same plane before the first lifter 14 and the hinge member 13 are aligned on the same plane.

In this way, according to the present embodiment, the behaviors of the first lifter 14 and the second lifter 15 when the housing unit 2 is opened/closed can be controlled by the magnets 41 to 44, and the movements of the first lifter 14 and the second lifter 15 can be reversed in the closing and opening operation of the housing unit 2.

Note that simply by only changing the sliding resistance of the shaft 22 that serves as the axis of the first lifter 14 and the sliding resistance of the shaft 23 that serves as the axis of the second lifter 15, the movements of the first lifter 14 and the second lifter 15 become the same in the closing operation and the opening operation of the housing unit 2, and the behaviors of the first lifter 14 and the second lifter 15 change in the closing operation and the opening operation of the housing unit 2.

Figure 21:
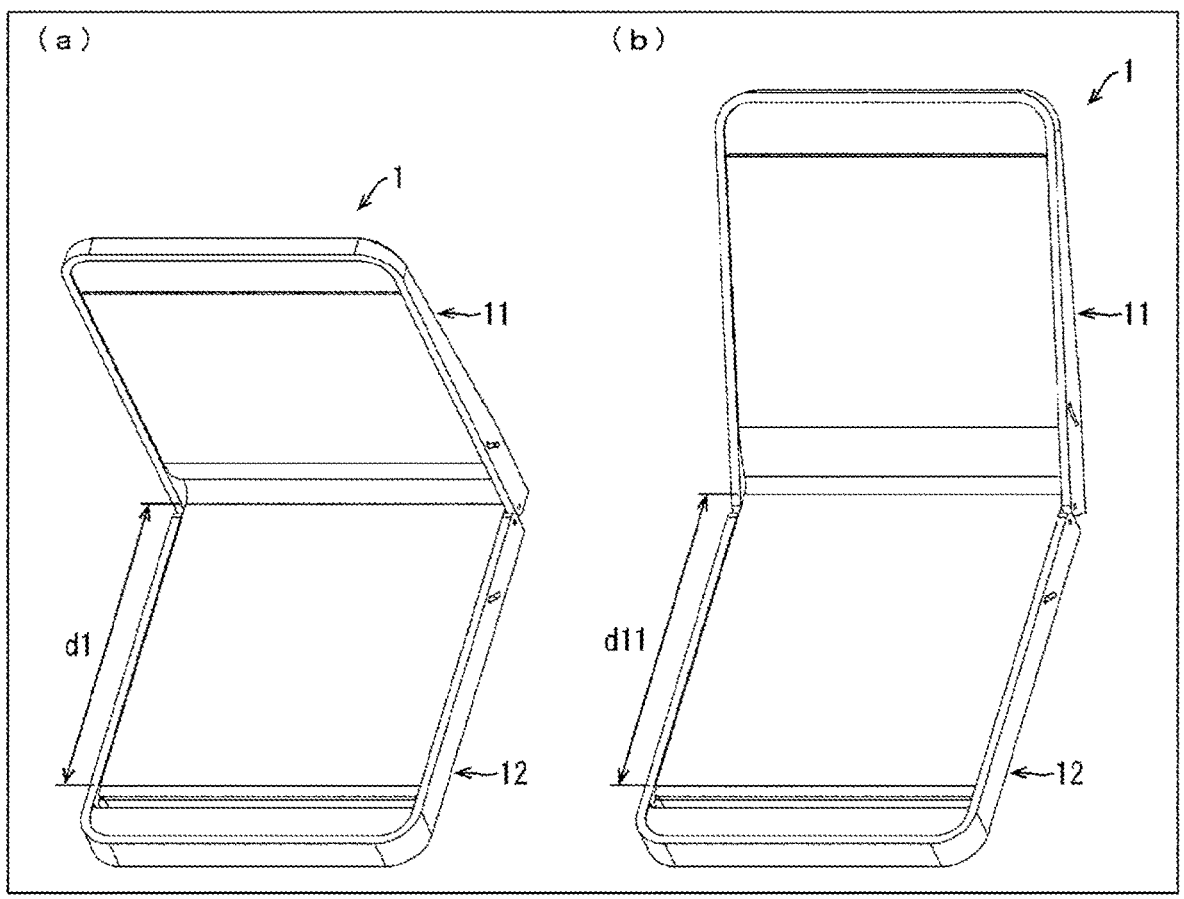
FIG. 21(a) is a perspective view illustrating a state in which the display device according to the third embodiment is open at 90 degrees, and (b) is a perspective view illustrating a state in which the display device according to the third embodiment is open at 135 degrees.
Figure 22:
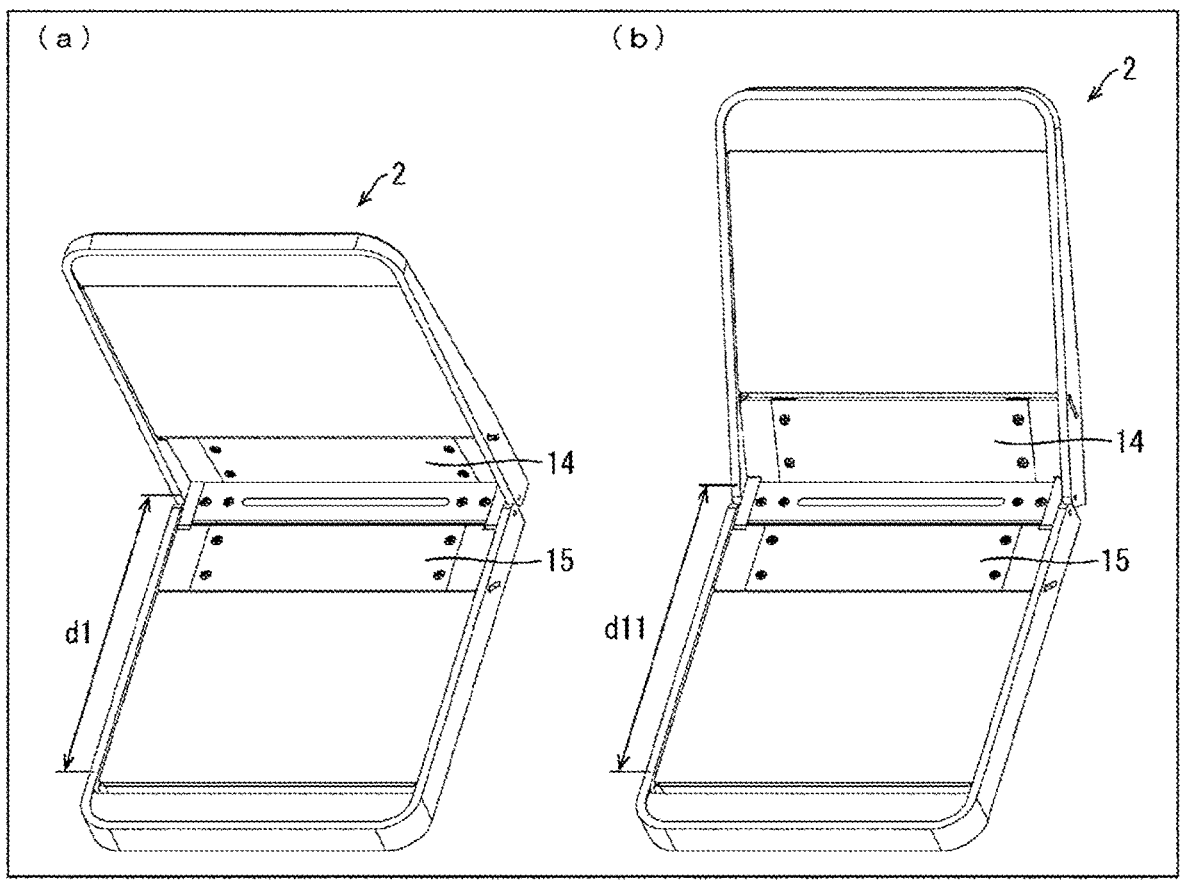
FIG. 22(a) is a perspective view illustrating a state in which the display panel is removed in (a) of FIG. 21, and (b) is a perspective view illustrating a state in which the display panel is removed in (b) of FIG. 21.
Figure 23:
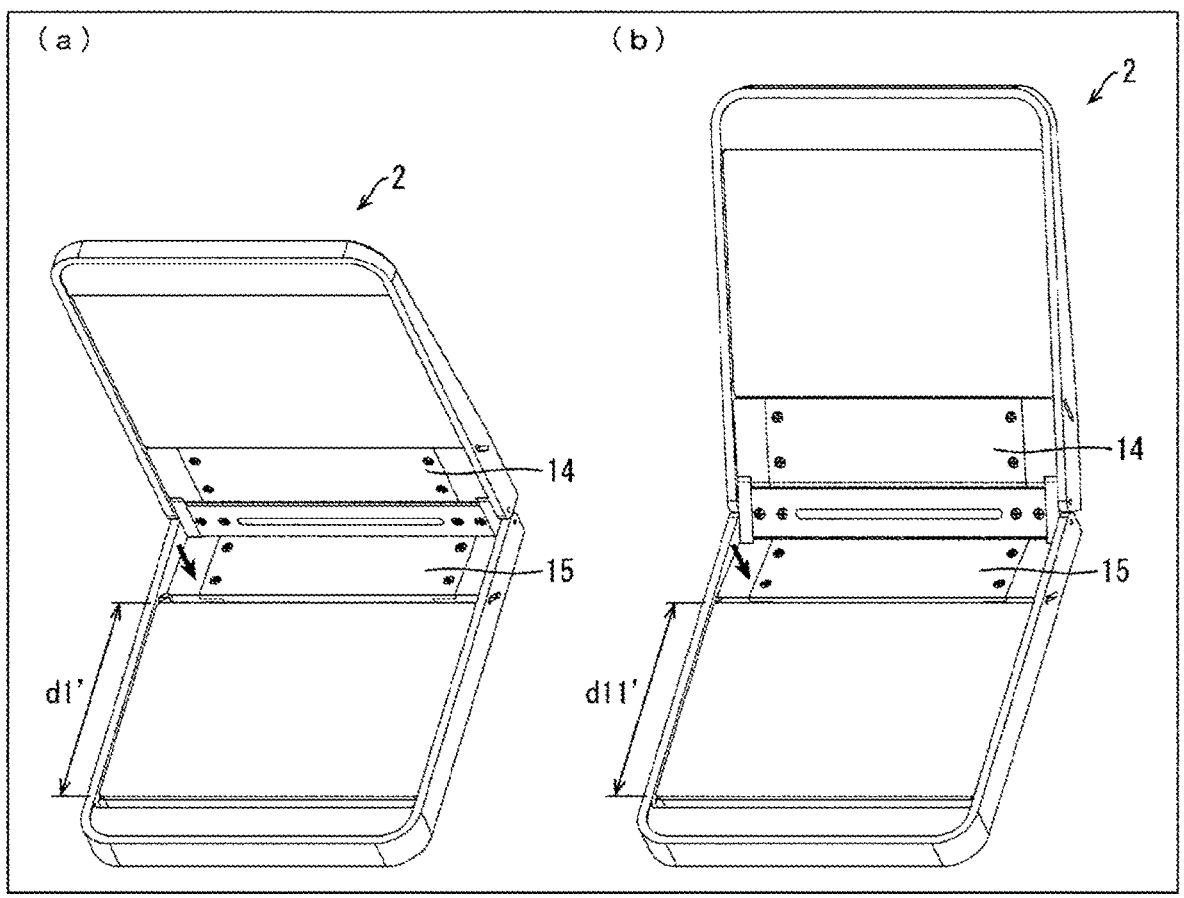
FIG. 23(a) is a perspective view illustrating a state in which the display panel is removed in a case where magnets are not provided in (a) of FIG. 21, and (b) is a perspective view illustrating a state in which the display panel is removed in a case where the magnets are not provided in (b) of FIG. 21.

(a) of FIG. 21 is a perspective view illustrating a state in which the display device 1 is open at 90 degrees, and (b) of FIG. 21 is a perspective view illustrating a state in which the display device 1 is open at 135 degrees. (a) of FIG. 22 is a perspective view illustrating a state in which the display panel 3 is removed in (a) of FIG. 21, and (b) of FIG. 22 is a perspective view illustrating a state in which the display panel 3 is removed in (b) of FIG. 21. (a) of FIG. 23 is a perspective view illustrating a state in which the display panel 3 is removed in a case where the magnets 41 to 44 are not provided in (a) of FIG. 21, and (b) of FIG. 23 is a perspective view illustrating a state in which the display panel 3 is removed in a case where the magnets 41 to 44 are not provided in (b) of FIG. 21. Note that (a) and (b) of FIG. 21 to (a) and (b) of FIG. 23 illustrate a case in which the display device 1 is used, for example, as a laptop PC (personal computer) on a desk.

For example, as illustrated in (a) and (b) of FIG. 21, an electronic key may be displayed on the lower half of the screen, and the lower half of the screen may be used as a keyboard, for example, such as in a case where the display device 1 is applied for a clamshell type PC (laptop PC) or the like. In this case, the display device 1 is often used in a state of being open at 90 degrees or more. For this reason, a state in which a touch panel can be used is desirable in the lower half of the screen of the display device 1.

Therefore, it is desirable that the second lifter 15, which is the lifter on the lower side of the screen, can be held up as much as possible regardless of the angle of opening/closing of the display device 1 (in other words, the angle of opening/closing of the housing unit 2).

In accordance with the present embodiment, as described above, when the housing unit 2 is closed from a state of being open at 180 degrees, the first lifter 14 is held up while the second lifter 15 remains aligned on the same plane as the hinge member 13 (i.e., remains held up), and when the housing unit 2 is going to be opened from a state of being folded, the second lifter 15 is held up before the first lifter 14 is held up. In this way, the upper portion of the second lifter 15 can be used as a touch panel even in a case where any operation is performed, and as illustrated in (a) and (b) of FIG. 22, the entire lower half of the screen can be used as a touch panel.

In contrast, as illustrated in (a) and (b) of FIG. 23, when the second lifter 15 is held down before the first lifter 14, the upper portion of the second lifter 15 cannot be used as a touch panel.

Thus, in a case where a length in a direction perpendicular to the axis about which the housing unit 2 is folded in a region which can be used as a touch panel in the lower half of the screen in the display device 1 illustrated in (a) of FIG. 21 and (a) of FIG. 22 is defined as d1, a length in a direction perpendicular to the axis about which the housing unit 2 is folded in a region which can be used as a touch panel in the lower half of the screen in the display device 1 illustrated in (b) of FIG. 21 and (b) of FIG. 22 is defined as d11, a length in a direction perpendicular to the axis about which the housing unit 2 is folded in a region which can be used as a touch panel in the lower half of the screen in the display device 1 illustrated in (a) of FIG. 23 is defined as d1', and a length in a direction perpendicular to the axis about which the housing unit 2 is folded in a region which can be used as a touch panel in the lower half of the screen in the display device 1 illustrated in (b) of FIG. 23 is defined as d11', d1>d1' and d11>d11' are satisfied.

FIRST MODIFIED EXAMPLE

Note that, in the present embodiment, the case in which the magnet 41 is disposed on a face of the first lifter 14 on the opposite side to the face facing the display panel 3 and the magnet 42 is disposed on a face of the groove portion 11*j* of the first housing 11 on the bottom portion 12*e* side of the second housing 12 is described as an example, but the present embodiment is not limited thereto, and a magnet may be disposed on one face of the faces described above and the other face may be formed of metal.

Similarly, in the present embodiment, the case in which the magnets 43 are disposed in the second lifter 15 on the side surfaces 15*e* and 15*f* facing the sidewalls 12*c* and 12*d* of the second housing 12, and the magnets 44 are disposed on the sidewalls 12*c* and 12*d* of the second housing 12 facing the side surfaces 15*e* and 15*f* is described as an example, but the present embodiment is not limited thereto, and a magnet may be disposed on one side surface of each of the side surfaces of the second housing 12 (sidewalls 12*c* and 12*d*) and the side surfaces 15*e* and 15*f* of the second lifter 15, and the other side surface may be formed of metal.

Figure 24:
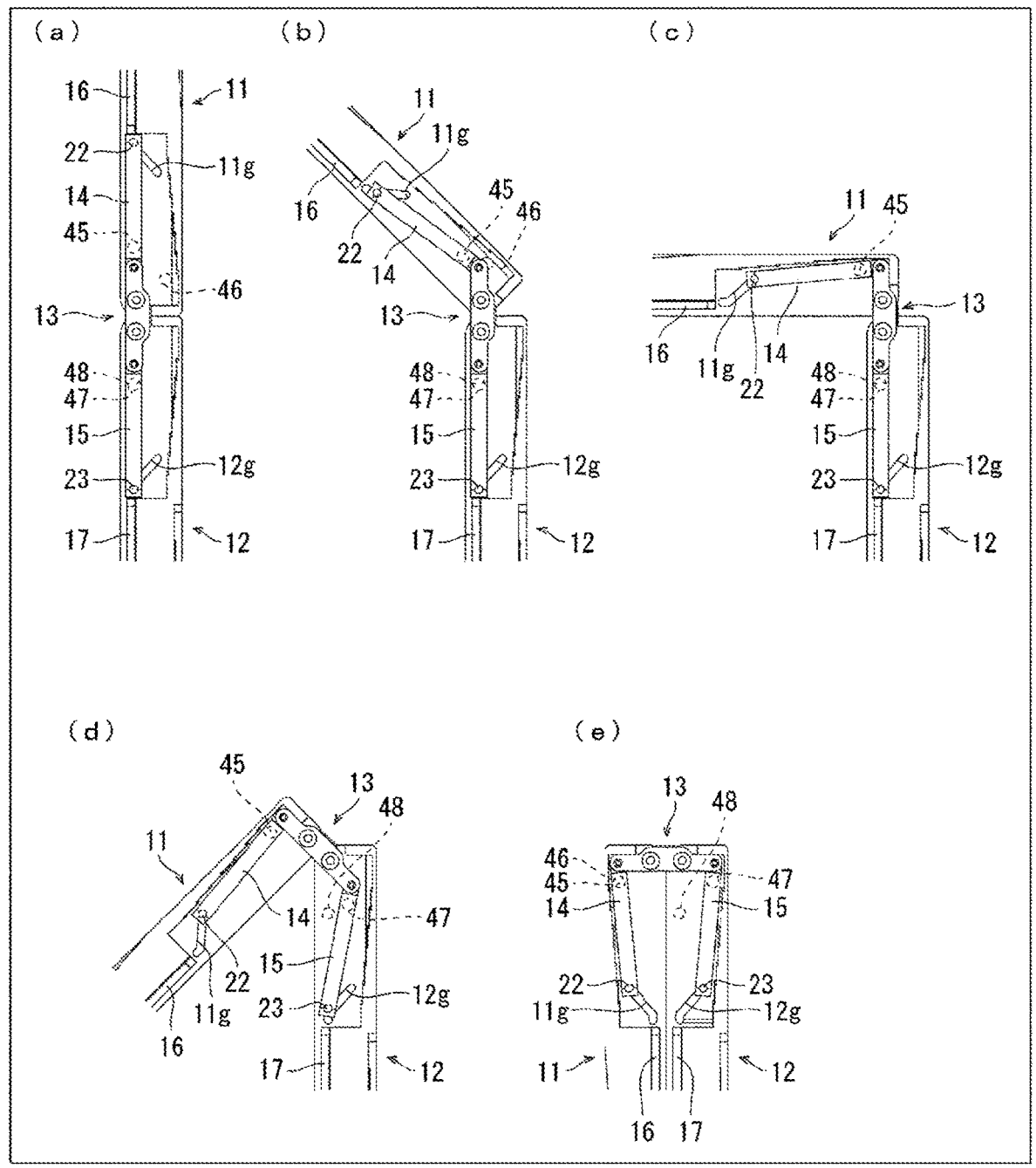
FIGS. 24(a) to (e) are cross-sectional views of main portions illustrating an opening/closing operation of a housing unit according to a second modified example of the third embodiment.

SECOND MODIFIED EXAMPLE (a) to (e) of FIG. 24 are cross-sectional views of main portions illustrating the opening/closing operation of a housing unit 2 according to the present modified example. Note that in (a) to (e) of FIG. 24, the spring 24 and the like are not illustrated, but as described in the first embodiment, the spring 24 and the like are not necessarily required.

As illustrated in (a) to (e) of FIG. 24, the housing unit 2 according to the present modified example includes, instead of the magnets 43 and 44, the protruding portion 47 and the recessed portion 48 as a second retention mechanism.

Note that in (a) to (e) of FIG. 24, an example is given of a case in which the protruding portion 47, for example, is disposed on side surfaces (side surfaces 15*e* and 15*f*) of the second lifter 15 facing side surfaces (sidewalls 12*c* and 12*d*) of the second housing 12, and a recessed portion 48 is disposed on the sidewalls 12*c* and 12*d* of the second housing 12 facing the side surfaces 15*e* and 15*f*.

However, the present embodiment is not limited thereto, and the recessed portion 48 may be disposed in the second lifter 15, and the protruding portion 47 may be disposed in the second housing 12.

In this way, the second retention mechanism includes the recessed portion 48 provided on either ones of and the protruding portion 47 provided on the other ones of the side surfaces (side surfaces 15*e* and 15*f*) facing the side surfaces (sidewalls 12*c* and 12*d*) of the second housing 12 in the second lifter 15 and the sidewalls 12*c* and 12*d* of the second housing 12 facing the side surfaces 15*e* and 15*f* in a state in which the housing unit 2 is open at 180 degrees. The relative movement between the second lifter 15 and the second housing 12 may be suppressed when the housing unit 2 open at 180 degrees is going to be closed, by the recessed portion 48 described above and the protruding portion 47 described above mating with each other in a state in which the housing unit 2 is open at 180 degrees.

Note that, as illustrated in (a) to (e) of FIG. 24, the positional relationship between the protruding portion 47 and the recessed portion 48 and the positional relationship between the magnets 43 and 44 are the same. Therefore, in the description of the third embodiment, the magnets 43 and 44 can be read as the protruding portion 47 and the recessed portion 48, respectively. The attraction by the magnetic force can be read as mating between the protruding portion 47 and the recessed portion 48.

Note that in the present modified example as well, as illustrated in (a) to (e) of FIG. 24, the hinge member 13, the first lifter 14, the second lifter 15, the first adhering plate 16, and the second adhering plate 17 are aligned so as to be on the same plane in a state in which the housing unit 2 is deployed at 180 degrees such that the display panel 3 is deployed at 180 degrees. Due to the opening/closing operation of the housing unit 2, the hinge member 13, the first lifter 14, the second lifter 15, the first adhering plate 16, and the second adhering plate 17 move as illustrated in (a) to (e) of FIG. 24.

In the present modified example, as a first retention mechanism, a protruding portion 45 is disposed on each of side surfaces (side surfaces 14*e* and 14*f* illustrated in FIG. 17) facing side surfaces (sidewalls 11*c* and 11*d*) of the first housing 11 in the first lifter 14, and a recessed portion 46 is disposed on each of the sidewalls 11*c* and 11*d* of the first housing 11 facing the side surfaces 14*e* and 14*f*. Note that the sidewall 11*c* and the sidewall 11*d* of the first housing 11 are formed so as to be symmetrical with respect to a plane, and the side surface 14*e* and the side surface 14*f* of the first lifter 14 are formed so as to be symmetrical with respect to a plane.

As illustrated in (a) of FIG. 24, the protruding portion 45 and the recessed portion 46 are disposed in a face-to-face relationship and mate with each other in a state in which the housing unit 2 is folded.

The protruding portion 45 is disposed to be located on the same plane as the shafts 18 to 24 in a state in which the housing unit 2 is deployed at 180 degrees. As illustrated in (e) of FIG. 24, the recessed portion 46 is provided on each of the sidewalls 11*c* and 11*d* of the first housing 11 on the bottom portion 11*e* side of the first housing 11 in a position facing the protruding portion 45 in a state in which the housing unit 2 is folded. As a result, in the present modified example, by the protruding portion 45 and the recessed portion 46 mating with each other in a state in which the housing unit 2 is folded, the relative movement between the first lifter 14 and the first housing 11 is suppressed when the housing unit 2 is going to be opened from the folded state.

Note that, in a state in which the housing unit 2 is folded and closed, the protruding portion 45 may be provided on either ones of and the recessed portion 46 may be provided on the other ones of the side surfaces 14*e* and 14*f* facing the sidewalls 11*c* and 11*d* of the first housing 11 in the first lifter 14 and the sidewalls 11*c* and 11*d* of the first housing 11 facing the side surfaces 14*e* and 14*f*. The recessed portion 46 may be disposed in the first lifter 14, and the protruding portion 45 may be disposed in the first housing 11.

In the housing unit 2 according to the present modified example, in a state in which the housing unit 2 is folded and closed such that the display panel 3 is in a folded state, the protruding portion 45 and the recessed portion 46 mate with each other while the protruding portion 47 and the recessed portion 48 are disposed at different heights and do not mate with each other. Conversely, in a state in which the housing unit 2 is deployed at 180 degrees, the protruding portion 47 and the recessed portion 48 mate with each other while the protruding portion 45 and the recessed portion 46 are disposed at different heights and do not mate with each other.

Thus, according to the present modified example, by forming the protruding portions 45 and 47 and the recessed portions 46 and 48 as described above in the housing unit 2, the same effects as in a case where the magnets 41 to 44 are formed in the housing unit 2 can be obtained.

Figure 25:
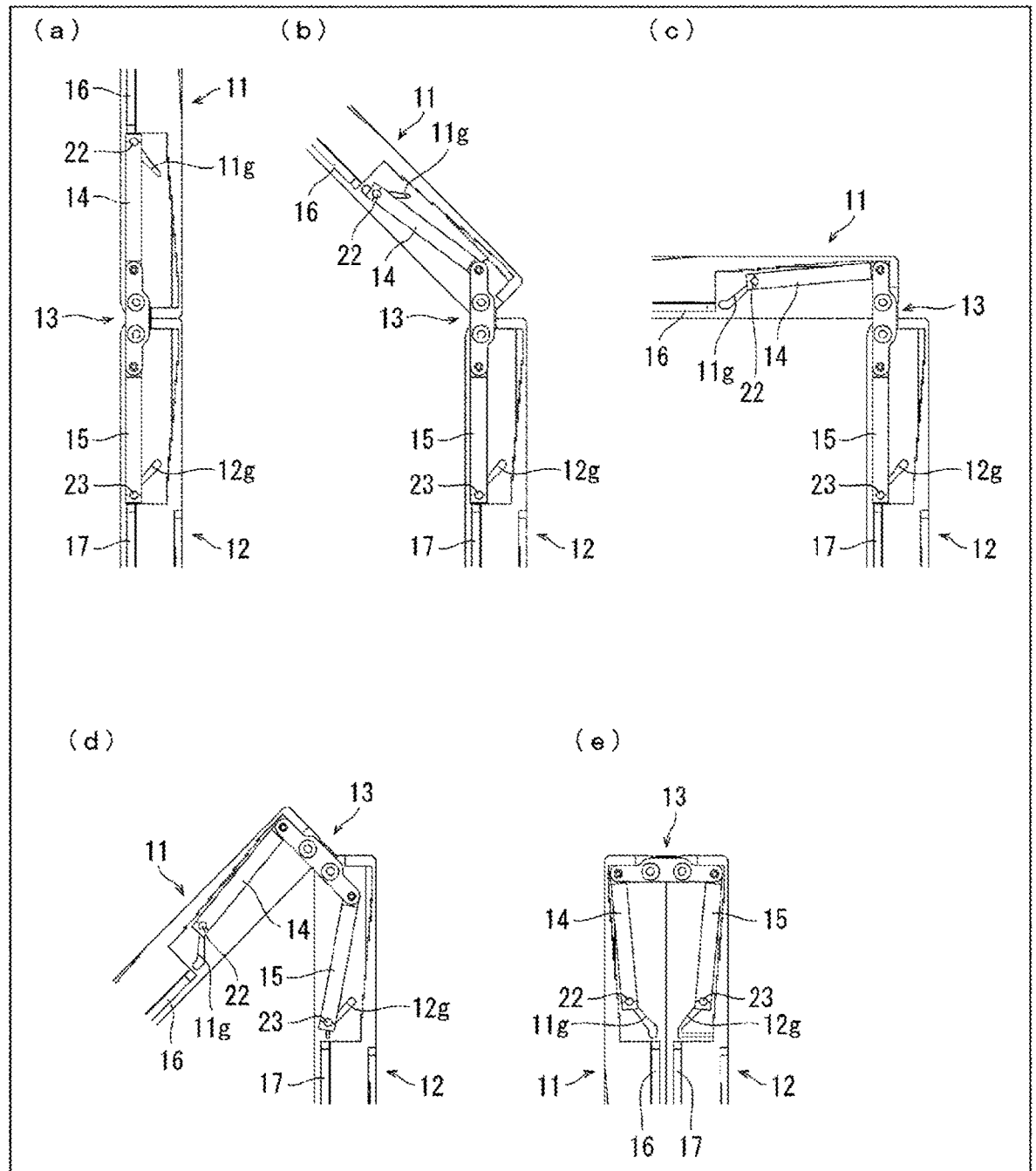
FIGS. 25(a) to (e) are cross-sectional views of main portions illustrating an opening/closing operation of a housing unit according to a third modified example of the third embodiment.

THIRD MODIFIED EXAMPLE (a) to (e) of FIG. 25 are cross-sectional views of main portions illustrating the opening/closing operation of a housing unit 2 according to the present modified example. Note that in (a) to (e) of FIG. 25, the spring 24 and the like are not illustrated, but as described in the first embodiment, the spring 24 and the like are not necessarily required.

In the present modified example, as illustrated in (a) to (e) of FIG. 25, the width of the link groove 11g is narrower on the bottom portion 11e side of the first housing 11 than on the display panel 3 side. This prevents movement of the shaft 22 (in other words, the connecting portion between the link groove 11g and the end portion 14b of the first lifter 14) more in a state in which the housing unit 2 is folded than in a state in which the housing unit 2 is deployed at 180 degrees. Thus, in the present modified example, the link groove 11g itself functions as a first retention mechanism.

In the present modified example, the width of the link groove 12g is narrower on the display panel 3 side than on the bottom portion 12e side of the second housing 12. This prevents the movement of the shaft 23 (in other words, the connecting portion between the link groove 12g and the end portion 15b of the second lifter 15) more in a state in which the housing unit 2 is deployed at 180 degrees than in a state in which the housing unit 2 is folded. Thus, in the present modified example, the link groove 12g itself functions as a second retention mechanism.

Therefore, in the present modified example as well, the same effects as those of the embodiments and the modified examples described above can be obtained.

FOURTH MODIFIED EXAMPLE

The display device 1 may include the first retention mechanism and the second retention mechanism illustrated in the embodiments and the modified examples described above alone, as the first retention mechanism and the second retention mechanism, or may include a combination of the above.

For example, the display device 1 may include only the magnets 41 to 44 as the first retention mechanism and the second retention mechanism, may include both of the magnets 41 to 44 and the protruding portions 45 and 47 and the recessed portions 46 and 48, or may include the magnets 41 and 42 as the first retention mechanism while including the protruding portion 47 and the recessed portion 48 as the second retention mechanism. Of course, in addition to the configurations described above, the shapes of the link grooves 11g and 12g may be changed as illustrated in the third modified example. The first retention mechanism and the second retention mechanism described above can be used in various combinations.

Supplement

A display device according to a first aspect of the disclosure is a display device including: a housing unit being foldable; and a display panel with flexibility, wherein the housing unit includes a hinge member having an elongated shape, a first housing and a second housing connected via the hinge member, a first support member in a flat plate shape provided in the first housing and supporting the display panel, a second support member in a flat plate shape provided in the second housing and supporting the display panel, a first fulcrum connecting the hinge member and an end portion of the first housing in a manner of being relatively rotatable between the hinge member and the first housing, a second fulcrum connecting the hinge member and an end portion of the second housing in a manner of being relatively rotatable between the hinge member and the second housing, a third fulcrum connecting the hinge member and a first end portion of the first support member in a manner of being relatively rotatable between the hinge member and the first support member, and a fourth fulcrum connecting the hinge member and a first end portion of the second support member in a manner of being relatively rotatable between the hinge member and the second support member, a first long hole is provided in the first housing, and the first long hole and a second end portion in the first support member on an opposite side to the first end portion are slidably connected, a second long hole is provided in the second housing, and the second long hole and a second end portion of the second support member on an opposite side to the first end portion are slidably connected, and in the display panel, one end portion of the display panel is fixed to the first housing, another end portion of the display panel is fixed to the second housing, and the hinge member, the first support member, and the second support member are arranged to be aligned on a same plane in a state in which the housing unit is opened to allow the display panel to be in an open state at 180 degrees.

A display device according to a second aspect of the disclosure is the display device according to the first aspect, wherein in a state in which the housing unit is folded and closed to allow the display panel to be in a folded state, the first support member, the second support member, and the hinge member may form a space enclosed by the first support member, the second support member, and the hinge member to accommodate a bulge of a folded portion of the display panel.

A display device according to a third aspect of the disclosure is the display device according to the second aspect, wherein in a state in which the housing unit is folded and closed to allow the display panel to be in a folded state, a connecting portion between the first long hole and the second end portion of the first support member may be disposed at a position furthest from the display panel in the first long hole, and a connecting portion between the second long hole and the second end portion of the second support member may be disposed at a position furthest from the display panel in the second long hole.

A display device according to a fourth aspect of the disclosure is the display device according to any one of the first to third aspects, wherein the first long hole may be provided in an oblique direction from a side of a bottom portion of the first housing toward a side of the display panel in a direction away from a side of the hinge member to allow the first support member to move in accordance with an open/closed state of the housing unit, and the second long hole may be provided in an oblique direction from a side of a bottom portion of the second housing toward a side of the display panel in a direction away from a side of the hinge member to allow the second support member to move in accordance with an open/closed state of the housing unit.

A display device according to a fifth aspect of the disclosure is the display device according to any one of the first to fourth aspects, wherein in a state in which the housing unit is opened to allow the display panel to be in an open state at 180 degrees, a connecting portion between the first long hole and the second end portion of the first support member may be disposed at a position closest to the display panel in the first long hole, a connecting portion between the second long hole and the second end portion of the second support member may be disposed at a position closest to the display panel in the second long hole, and the hinge member, the first support member, and the second support member may be aligned on a same plane.

A display device according to a sixth aspect of the disclosure is the display device according to any one of the first to fifth aspects, wherein the third fulcrum, the first fulcrum, the second fulcrum, and the fourth fulcrum may be aligned in this order from a side of the first housing to a side of the second housing in the hinge member, in a state in which the housing unit is opened to allow the display panel to be in an open state at 180 degrees, the third fulcrum and the fourth fulcrum may be disposed on a side of the display panel, and in a state in which the housing unit is folded and closed to allow the display panel to be in a folded state, the third fulcrum and the fourth fulcrum may be disposed on respective sides of the bottom portions of the first housing and the second housing.

A display device according to a seventh aspect of the disclosure is the display device according to any one of the first to sixth aspects, wherein the first housing may be provided with a first adhering plate in a flat plate shape to which the display panel is fixed, the second housing may be provided with a second adhering plate in a flat plate shape to which the display panel is fixed, and one end portion of the display panel may be fixed to the first adhering plate, and another end portion opposite to the one end portion may be fixed to the second adhering plate.

A display device according to an eighth aspect of the disclosure is the display device according to the seventh aspect, wherein in a state in which the housing unit is opened to allow the display panel to be in an open state at 180 degrees, the hinge member, the first support member, the second support member, the first adhering plate, and the second adhering plate may be aligned on a same plane.

A display device according to a ninth aspect of the disclosure is the display device according to the seventh or eighth aspect, wherein the first adhering plate may be fixed to the first housing, and the second adhering plate may be fixed to the second housing.

A display device according to a tenth aspect of the disclosure is the display device according to the seventh or eighth aspect, wherein the second adhering plate may be formed to be movable along the second housing in a direction parallel to an adhering surface of the display panel in the second adhering plate and perpendicular to an axis about which the housing unit is folded.

A display device according to an eleventh aspect of the disclosure is the display device according to the tenth aspect, wherein the housing unit may further include an elastic member arranged to expand and contract in a direction parallel to the adhering surface of the display panel in the second adhering plate and perpendicular to the axis about which the housing unit is folded, between a face of the second adhering plate on an opposite side to the adhering surface of the display panel and a face of the second housing facing the face on the opposite side.

A display device according to a twelfth aspect of the disclosure is the display device according to the eleventh aspect, wherein the elastic member may include tension in a direction that pulls the second adhering plate and the second support member apart from each other.

A display device according to a thirteenth aspect of the disclosure is the display device according to any one of the first to twelfth aspects, wherein the housing unit may further include a first retention mechanism retaining a positional relationship between the hinge member and the first housing and a positional relationship between the hinge member and the first support member when the housing unit is going to be opened from a state in which the housing unit is folded and closed to allow the display panel to be in a folded state and a second retention mechanism retaining a positional relationship between the hinge member and the second housing and a positional relationship between the hinge member and the second support member when the housing unit is going to be closed from a state in which the housing unit is opened to allow the display panel to be in an open state at 180 degrees.

A display device according to a fourteenth aspect of the disclosure is the display device according to the thirteenth aspect, wherein the first retention mechanism may include a magnet, and the magnet may be disposed on at least one face of a face of the first support member on an opposite side to a face facing the display panel and a face of the first housing facing the face on the opposite side to allow the first housing and the first support member to be attracted by a magnetic force in a state in which the housing unit is folded to allow the display panel to be in a folded state.

A display device according to a fifteenth aspect of the disclosure is the display device according to the fourteenth aspect, wherein the magnet may be disposed on one face of the face of the first support member on the opposite side to the face facing the display panel and the face of the first housing facing the face on the opposite side, and another face may be formed of metal.

A display device according to a sixteenth aspect of the disclosure is the display device according to any one of the thirteenth to fifteenth aspects, wherein the second retention mechanism may include a magnet, and the magnet may be disposed on at least one face of a side surface of the second support member facing the second housing and a side surface of the second housing facing the side surface of the second support member to allow the second housing and the second support member to be attracted by a magnetic force in a state in which the housing unit is opened to allow the display panel to be in an open state at 180 degrees.

A display device according to a seventeenth aspect of the disclosure is the display device according to the sixteenth aspect, wherein the magnet may be disposed on one side surface of a side surface of the second support member facing the second housing and a side surface of the second housing facing the side surface of the second support member, and another side surface may be formed of metal.

A display device according to an eighteenth aspect of the disclosure is the display device according to any one of the thirteenth to seventeenth aspects, wherein the first retention mechanism may include the first long hole, a width of the first long hole may be narrower on a side of the bottom portion of the first housing than on a side of the display panel, and movement of the connecting portion between the first long hole and the second end portion of the first support member may be prevented more in a state in which the housing unit is folded and closed to allow the display panel to be in a folded state than in a state in which the housing unit is opened to allow the display panel to be in an open state at 180 degrees.

A display device according to a nineteenth aspect of the disclosure is the display device according to any one of the thirteenth to eighteenth aspects, wherein the second retention mechanism may include the second long hole, a width of the second long hole may be narrower on a side of the display panel than on a side of the bottom portion of the second housing, and movement of the connecting portion between the second long hole and the second end portion of the second support member may be prevented more in a state in which the housing unit is opened to allow the display panel to be in an open state at 180 degrees than in a state in which the housing unit is folded and closed to allow the display panel to be in a folded state.

A display device according to a twentieth aspect of the disclosure is the display device according to any one of the thirteenth to nineteenth aspects, wherein the first retention mechanism may include a recessed portion provided on one side surface and a protruding portion provided on another side surface of a side surface of the first support member facing the first housing and a side surface of the first housing facing the side surface of the first support member in a state in which the housing unit is folded and closed to allow the display panel to be in a folded state, and relative movement between the first support member and the first housing may be suppressed by the recessed portion and the protruding portion mating with each other in the state in which the housing unit is closed when the housing unit is going to be opened from the state in which the housing unit is closed.

A display device according to a twenty-first aspect of the disclosure is the display device according to any one of the thirteenth to twentieth aspects, wherein the second retention mechanism may include a recessed portion provided on one side surface and a protruding portion provided on another side surface of a side surface of the second support member facing the second housing and a side surface of the second housing facing the side surface of the second support member in a state in which the housing unit is opened to allow the display panel to be in an open state at 180 degrees, and relative movement between the second support member and the second housing may be suppressed by the recessed portion and the protruding portion mating with each other in the state in which the housing unit is opened when the housing unit is going to be closed from the state in which the housing unit is opened.

A display device according to a twenty-second aspect of the disclosure is the display device according to any one of the thirteenth to twenty-first aspects, wherein by the first retention mechanism, relative movement between the first support member and the first housing may be restricted when the housing unit is going to be opened from a state in which the housing unit is folded and closed to allow the display panel to be in a folded state, and the second support member and the hinge member may be aligned on a same plane before the first support member and the hinge member are aligned on a same plane.

A display device according to a twenty-third aspect of the disclosure is the display device according to any one of the thirteenth to twenty-second aspects, wherein by the second retention mechanism, relative movement between the second support member and the second housing may be restricted when the housing unit is going to be closed from a state in which the housing unit is opened to allow the display panel to be in an open state at 180 degrees, and the first support member and the hinge member may move relative to each other while the second support member and the hinge member remain aligned on a same plane before the second support member and the hinge member move relative to each other.

A display device according to a twenty-fourth aspect of the disclosure is the display device according to any one of the first to twenty-third aspects, wherein the display panel may include a touch panel.

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in the embodiments.

The invention claimed is:

1. A display device including comprising:
  a housing unit being foldable; and
  a display panel with flexibility,
  wherein the housing unit includes
  a hinge member having an elongated shape,
  a first housing and a second housing connected via the hinge member,
  a first support member in a flat plate shape provided in the first housing and supporting the display panel,
  a second support member in a flat plate shape provided in the second housing and supporting the display panel,
  a first fulcrum connecting the hinge member and an end portion of the first housing in a manner of being relatively rotatable between the hinge member and the first housing,
  a second fulcrum connecting the hinge member and an end portion of the second housing in a manner of being relatively rotatable between the hinge member and the second housing,
  a third fulcrum connecting the hinge member and a first end portion of the first support member in a manner of being relatively rotatable between the hinge member and the first support member, and
  a fourth fulcrum connecting the hinge member and a first end portion of the second support member in a manner of being relatively rotatable between the hinge member and the second support member,
  a first long hole is provided in the first housing, and the first long hole and a second end portion in the first support member on an opposite side to the first end portion are slidably connected,
  a second long hole is provided in the second housing, and the second long hole and a second end portion of the second support member on an opposite side to the first end portion are slidably connected, and
  in the display panel,
  one end portion of the display panel is fixed to the first housing,
  another end portion of the display panel is fixed to the second housing, and
  the hinge member, the first support member, and the second support member are arranged to be aligned on a same plane in a state in which the housing unit is opened to allow the display panel to be in an open state at 180 degrees.

2. The display device according to claim 1,
  wherein in a state in which the housing unit is folded and closed to allow the display panel to be in a folded state, the first support member, the second support member, and the hinge member form a space enclosed by the first support member, the second support member, and the hinge member to accommodate a bulge of a folded portion of the display panel.

3. The display device according to claim 2,
wherein in a state in which the housing unit is folded and closed to allow the display panel to be in a folded state,
a connecting portion between the first long hole and the second end portion of the first support member is disposed at a position furthest from the display panel in the first long hole, and
a connecting portion between the second long hole and the second end portion of the second support member is disposed at a position furthest from the display panel in the second long hole.

4. The display device according to claim 1,
wherein the first long hole is provided in an oblique direction from a side of a bottom portion of the first housing toward a side of the display panel in a direction away from a side of the hinge member to allow the first support member to move in accordance with an open/closed state of the housing unit, and
the second long hole is provided in an oblique direction from a side of a bottom portion of the second housing toward a side of the display panel in a direction away from a side of the hinge member to allow the second support member to move in accordance with an open/closed state of the housing unit.

5. The display device according to claim 1,
wherein in a state in which the housing unit is opened to allow the display panel to be in an open state at 180 degrees,
a connecting portion between the first long hole and the second end portion of the first support member is disposed at a position closest to the display panel in the first long hole,
a connecting portion between the second long hole and the second end portion of the second support member is disposed at a position closest to the display panel in the second long hole, and
the hinge member, the first support member, and the second support member are aligned on a same plane.

6. The display device according to claim 1,
wherein the third fulcrum, the first fulcrum, the second fulcrum, and the fourth fulcrum are aligned in this order from a side of the first housing to a side of the second housing in the hinge member,
in a state in which the housing unit is opened to allow the display panel to be in an open state at 180 degrees, the third fulcrum and the fourth fulcrum are disposed on a side of the display panel, and
in a state in which the housing unit is folded and closed to allow the display panel to be in a folded state, the third fulcrum and the fourth fulcrum are disposed on respective sides of the bottom portions of the first housing and the second housing.

7. The display device according to claim 1,
wherein the first housing is provided with a first adhering plate in a flat plate shape to which the display panel is fixed,
the second housing is provided with a second adhering plate in a flat plate shape to which the display panel is fixed, and
one end portion of the display panel is fixed to the first adhering plate, and another end portion opposite to the one end portion is fixed to the second adhering plate.

8. The display device according to claim 7,
wherein in a state in which the housing unit is opened to allow the display panel to be in an open state at 180 degrees, the hinge member, the first support member, the second support member, the first adhering plate, and the second adhering plate are aligned on a same plane.

9. The display device according to claim 7,
wherein the first adhering plate is fixed to the first housing, and
the second adhering plate is fixed to the second housing.

10. The display device according to claim 7,
wherein the second adhering plate is formed to be movable along the second housing in a direction parallel to an adhering surface of the display panel in the second adhering plate and perpendicular to an axis about which the housing unit is folded.

11. The display device according to claim 10,
wherein the housing unit further includes
an elastic member arranged to expand and contract in a direction parallel to the adhering surface of the display panel in the second adhering plate and perpendicular to the axis about which the housing unit is folded, between a face of the second adhering plate on an opposite side to the adhering surface of the display panel and a face of the second housing facing the face on the opposite side.

12. The display device according to claim 1,
wherein the housing unit further includes
a first retention mechanism retaining a positional relationship between the hinge member and the first housing and a positional relationship between the hinge member and the first support member when the housing unit is going to be opened from a state in which the housing unit is folded and closed to allow the display panel to be in a folded state and
a second retention mechanism retaining a positional relationship between the hinge member and the second housing and a positional relationship between the hinge member and the second support member when the housing unit is going to be closed from a state in which the housing unit is opened to allow the display panel to be in an open state at 180 degrees.

13. The display device according to claim 12,
wherein the first retention mechanism includes a magnet, and
the magnet is disposed on at least one face of a face of the first support member on an opposite side to a face facing the display panel and a face of the first housing facing the face on the opposite side to allow the first housing and the first support member to be attracted by a magnetic force in a state in which the housing unit is folded to allow the display panel to be in a folded state.

14. The display device according to claim 13,
wherein the magnet is disposed on one face of the face of the first support member on the opposite side to the face facing the display panel and the face of the first housing facing the face on the opposite side, and another face is formed of metal.

15. The display device according to claim 12,
wherein the first retention mechanism includes the first long hole,
a width of the first long hole is narrower on a side of the bottom portion of the first housing than on a side of the display panel, and
movement of the connecting portion between the first long hole and the second end portion of the first support member is prevented more in a state in which the housing unit is folded and closed to allow the display panel to be in a folded state than in a state in which the housing unit is opened to allow the display panel to be in an open state at 180 degrees.

16. The display device according to claim 12,
wherein the second retention mechanism includes the second long hole,
a width of the second long hole is narrower on a side of the display panel than on a side of the bottom portion of the second housing, and
movement of the connecting portion between the second long hole and the second end portion of the second support member is prevented more in a state in which the housing unit is opened to allow the display panel to be in an open state at 180 degrees than in a state in which the housing unit is folded and closed to allow the display panel to be in a folded state.

17. The display device according to claim 12,
wherein the first retention mechanism includes a recessed portion provided on one side surface and a protruding portion provided on another side surface of a side surface of the first support member facing the first housing and a side surface of the first housing facing the side surface of the first support member in a state in which the housing unit is folded and closed to allow the display panel to be in a folded state, and
relative movement between the first support member and the first housing is suppressed by the recessed portion and the protruding portion mating with each other in the state in which the housing unit is closed when the housing unit is going to be opened from the state in which the housing unit is closed.

18. The display device according to claim 12,
wherein the second retention mechanism includes a recessed portion provided on one side surface and a protruding portion provided on another side surface of a side surface of the second support member facing the second housing and a side surface of the second housing facing the side surface of the second support member in a state in which the housing unit is opened to allow the display panel to be in an open state at 180 degrees, and
relative movement between the second support member and the second housing is suppressed by the recessed portion and the protruding portion mating with each other in the state in which the housing unit is opened when the housing unit is going to be closed from the state in which the housing unit is opened.

19. The display device according to claim 12,
wherein by the first retention mechanism,
relative movement between the first support member and the first housing is restricted when the housing unit is going to be opened from a state in which the housing unit is folded and closed to allow the display panel to be in a folded state, and
the second support member and the hinge member are aligned on a same plane before the first support member and the hinge member are aligned on a same plane.

20. The display device according to claim 12,
wherein by the second retention mechanism,
relative movement between the second support member and the second housing is restricted when the housing unit is going to be closed from a state in which the housing unit is opened to allow the display panel to be in an open state at 180 degrees, and
the first support member and the hinge member move relative to each other while the second support member and the hinge member remain aligned on a same plane before the second support member and the hinge member move relative to each other.

* * * * *